(12) United States Patent
Kumar

(10) Patent No.: US 8,687,639 B2
(45) Date of Patent: Apr. 1, 2014

(54) METHOD AND SYSTEM FOR ORDERING POSTED PACKETS AND NON-POSTED PACKETS TRANSFER

(75) Inventor: Ambuj Kumar, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 417 days.

(21) Appl. No.: 12/478,652

(22) Filed: Jun. 4, 2009

(65) Prior Publication Data

US 2010/0309918 A1    Dec. 9, 2010

(51) Int. Cl.
*H04L 12/28*    (2006.01)

(52) U.S. Cl.
USPC .......................... 370/394; 370/412; 370/395.4

(58) Field of Classification Search
None
See application file for complete search history.

(56) References Cited

U.S. PATENT DOCUMENTS

| | | |
|---|---|---|
| 3,940,740 A | 2/1976 | Coontz |
| 4,541,075 A | 9/1985 | Dill et al. |
| 4,773,044 A | 9/1988 | Sfarti et al. |
| 4,885,703 A | 12/1989 | Deering |
| 4,951,220 A | 8/1990 | Ramacher et al. |
| 4,985,988 A | 1/1991 | Littlebury |
| 5,036,473 A | 7/1991 | Butts et al. |
| 5,125,011 A | 6/1992 | Fung |
| 5,276,893 A | 1/1994 | Savaria |
| 5,379,405 A | 1/1995 | Ostrowski |
| 5,392,437 A | 2/1995 | Matter et al. |
| 5,448,496 A | 9/1995 | Butts et al. |
| 5,455,536 A | 10/1995 | Kono et al. |
| 5,513,144 A | 4/1996 | O'Toole |
| 5,513,354 A | 4/1996 | Dwork et al. |
| 5,578,976 A | 11/1996 | Yao |
| 5,630,171 A | 5/1997 | Chejlava, Jr. et al. |
| 5,634,107 A | 5/1997 | Yumoto et al. |
| 5,638,946 A | 6/1997 | Zavracky |
| 5,671,376 A | 9/1997 | Bucher et al. |
| 5,694,143 A | 12/1997 | Fielder et al. |
| 5,705,938 A | 1/1998 | Kean |
| 5,766,979 A | 6/1998 | Budnaitis |
| 5,768,178 A | 6/1998 | McLaury |
| 5,805,833 A | 9/1998 | Verdun |
| 5,884,053 A | 3/1999 | Clouser et al. |
| 5,896,391 A | 4/1999 | Solheim et al. |
| 5,909,595 A | 6/1999 | Rosenthal et al. |
| 5,913,218 A | 6/1999 | Carney et al. |
| 5,937,173 A | 8/1999 | Olarig et al. |
| 5,956,252 A | 9/1999 | Lau et al. |

(Continued)

OTHER PUBLICATIONS

Dictionary.com, Definition of "Monitor", dated Jun. 15, 2011. pp. 1-4.

*Primary Examiner* — Robert Wilson

(57) ABSTRACT

A system for ordering packets. The system includes a first memory, e.g., FIFO, storing transition information for posted packets, e.g., 1 when a posted packet transitions from a non-posted packet and 0 otherwise. A second memory stores transition information for non-posted packets, e.g., 1 when a non-posted packet transitions from a posted packet and 0 otherwise. A counter increments responsive to detecting a transition in the first memory and decrements responsive to detecting a transition in the second memory. A controller orders a posted packet for transmission prior to a non-posted packet if a value of the counter is negative and when a transitional value associated with the non-posted packet is 1, and wherein the controller orders either a posted packet or a non-posted packet otherwise. The first and the second memory may be within a same memory component.

21 Claims, 25 Drawing Sheets

(56) References Cited

U.S. PATENT DOCUMENTS

| | | |
|---|---|---|
| 5,996,996 A | 12/1999 | Brunelle |
| 5,999,990 A | 12/1999 | Sharrit et al. |
| 6,003,083 A | 12/1999 | Davies et al. |
| 6,003,100 A | 12/1999 | Lee |
| 6,049,870 A | 4/2000 | Greaves |
| 6,065,131 A | 5/2000 | Andrews et al. |
| 6,067,262 A | 5/2000 | Irrinki et al. |
| 6,069,540 A | 5/2000 | Berenz et al. |
| 6,072,686 A | 6/2000 | Yarbrough |
| 6,085,269 A | 7/2000 | Chan et al. |
| 6,094,116 A | 7/2000 | Tai et al. |
| 6,219,628 B1 | 4/2001 | Kodosky et al. |
| 6,249,288 B1 | 6/2001 | Campbell |
| 6,255,849 B1 | 7/2001 | Mohan |
| 6,307,169 B1 | 10/2001 | Sun et al. |
| 6,323,699 B1 | 11/2001 | Quiet |
| 6,348,811 B1 | 2/2002 | Haycock et al. |
| 6,363,285 B1 | 3/2002 | Wey |
| 6,363,295 B1 | 3/2002 | Akram et al. |
| 6,366,968 B1 * | 4/2002 | Hunsaker ........................ 710/52 |
| 6,370,603 B1 | 4/2002 | Silverman et al. |
| 6,377,898 B1 | 4/2002 | Steffan et al. |
| 6,388,590 B1 | 5/2002 | Ng |
| 6,389,585 B1 | 5/2002 | Masleid et al. |
| 6,392,431 B1 | 5/2002 | Jones |
| 6,429,288 B1 | 8/2002 | Esswein et al. |
| 6,429,747 B2 | 8/2002 | Franck et al. |
| 6,433,657 B1 | 8/2002 | Chen |
| 6,437,657 B1 | 8/2002 | Jones |
| 6,486,425 B2 | 11/2002 | Seki |
| 6,504,841 B1 | 1/2003 | Larson et al. |
| 6,530,045 B1 | 3/2003 | Cooper et al. |
| 6,535,986 B1 | 3/2003 | Rosno et al. |
| 6,598,194 B1 | 7/2003 | Madge et al. |
| 6,629,181 B1 | 9/2003 | Alappat et al. |
| 6,662,133 B2 | 12/2003 | Engel et al. |
| 6,700,581 B2 | 3/2004 | Baldwin et al. |
| 6,701,466 B1 | 3/2004 | Fiedler |
| 6,717,474 B2 | 4/2004 | Chen et al. |
| 6,718,496 B1 | 4/2004 | Fukuhisa et al. |
| 6,734,770 B2 | 5/2004 | Aigner et al. |
| 6,738,856 B1 | 5/2004 | Milley et al. |
| 6,741,258 B1 | 5/2004 | Peck, Jr. et al. |
| 6,747,483 B2 | 6/2004 | To et al. |
| 6,782,587 B2 | 8/2004 | Reilly |
| 6,788,101 B1 | 9/2004 | Rahman |
| 6,794,101 B2 | 9/2004 | Liu et al. |
| 6,806,788 B1 | 10/2004 | Marumoto |
| 6,823,283 B2 | 11/2004 | Steger et al. |
| 6,825,847 B1 | 11/2004 | Molnar et al. |
| 6,849,924 B2 | 2/2005 | Allison et al. |
| 6,850,133 B2 | 2/2005 | Ma |
| 6,879,207 B1 | 4/2005 | Nickolls |
| 6,938,176 B1 | 8/2005 | Alben et al. |
| 6,956,579 B1 | 10/2005 | Diard et al. |
| 6,982,718 B2 | 1/2006 | Kilgard et al. |
| 7,020,598 B1 | 3/2006 | Jacobson |
| 7,058,738 B2 | 6/2006 | Stufflebeam, Jr. |
| 7,069,369 B2 | 6/2006 | Chou et al. |
| 7,069,458 B1 | 6/2006 | Sardi et al. |
| 7,075,542 B1 | 7/2006 | Leather |
| 7,075,797 B1 | 7/2006 | Leonard et al. |
| 7,085,824 B2 | 8/2006 | Forth et al. |
| 7,099,969 B2 | 8/2006 | McAfee et al. |
| 7,136,953 B1 | 11/2006 | Bisson et al. |
| 7,170,315 B2 | 1/2007 | Bakker et al. |
| 7,174,407 B2 | 2/2007 | Hou et al. |
| 7,174,411 B1 | 2/2007 | Ngai |
| 7,185,135 B1 | 2/2007 | Briggs et al. |
| 7,187,383 B2 | 3/2007 | Kent |
| 7,225,287 B2 | 5/2007 | Wooten |
| 7,246,274 B2 | 7/2007 | Kizer et al. |
| 7,260,007 B2 | 8/2007 | Jain et al. |
| RE39,898 E | 10/2007 | Nally et al. |
| 7,293,125 B2 | 11/2007 | McAfee et al. |
| 7,293,127 B2 | 11/2007 | Caruk |
| 7,305,571 B2 | 12/2007 | Cranford, Jr. et al. |
| 7,324,452 B2 | 1/2008 | Xu et al. |
| 7,324,458 B2 | 1/2008 | Schoenborn et al. |
| 7,340,541 B2 | 3/2008 | Castro et al. |
| 7,363,417 B1 | 4/2008 | Ngai |
| 7,383,412 B1 | 6/2008 | Diard |
| 7,398,336 B2 | 7/2008 | Feng et al. |
| 7,412,554 B2 | 8/2008 | Danilak |
| 7,415,551 B2 | 8/2008 | Pescatore |
| 7,424,564 B2 | 9/2008 | Mehta et al. |
| 7,469,311 B1 | 12/2008 | Tsu et al. |
| 7,480,757 B2 | 1/2009 | Atherton et al. |
| 7,480,808 B2 | 1/2009 | Caruk et al. |
| 7,525,986 B2 | 4/2009 | Lee et al. |
| 7,594,061 B2 | 9/2009 | Shen et al. |
| 7,660,917 B2 | 2/2010 | Freking et al. |
| 7,663,633 B1 | 2/2010 | Diamond et al. |
| 7,694,049 B2 | 4/2010 | Goh et al. |
| 7,698,477 B2 | 4/2010 | Breti et al. |
| 7,782,325 B2 | 8/2010 | Gonzalez et al. |
| 7,793,029 B1 | 9/2010 | Parson et al. |
| 7,822,025 B1 | 10/2010 | Joly |
| 7,849,235 B2 | 12/2010 | Ihara et al. |
| 8,132,015 B1 | 3/2012 | Wyatt |
| 2004/0090974 A1 | 5/2004 | Balakrishnan et al. |
| 2005/0038947 A1 | 2/2005 | Lueck et al. |
| 2007/0011383 A1 | 1/2007 | Berke et al. |
| 2008/0072098 A1 * | 3/2008 | Hunsaker et al. ............. 713/501 |
| 2008/0273545 A1 | 11/2008 | Sgouros et al. |
| 2009/0006708 A1 | 1/2009 | Lim |
| 2009/0086747 A1 * | 4/2009 | Naven et al. .................. 370/412 |
| 2009/0254692 A1 * | 10/2009 | Feehrer ........................ 710/315 |
| 2010/0309918 A1 * | 12/2010 | Kumar ........................ 370/394 |

\* cited by examiner

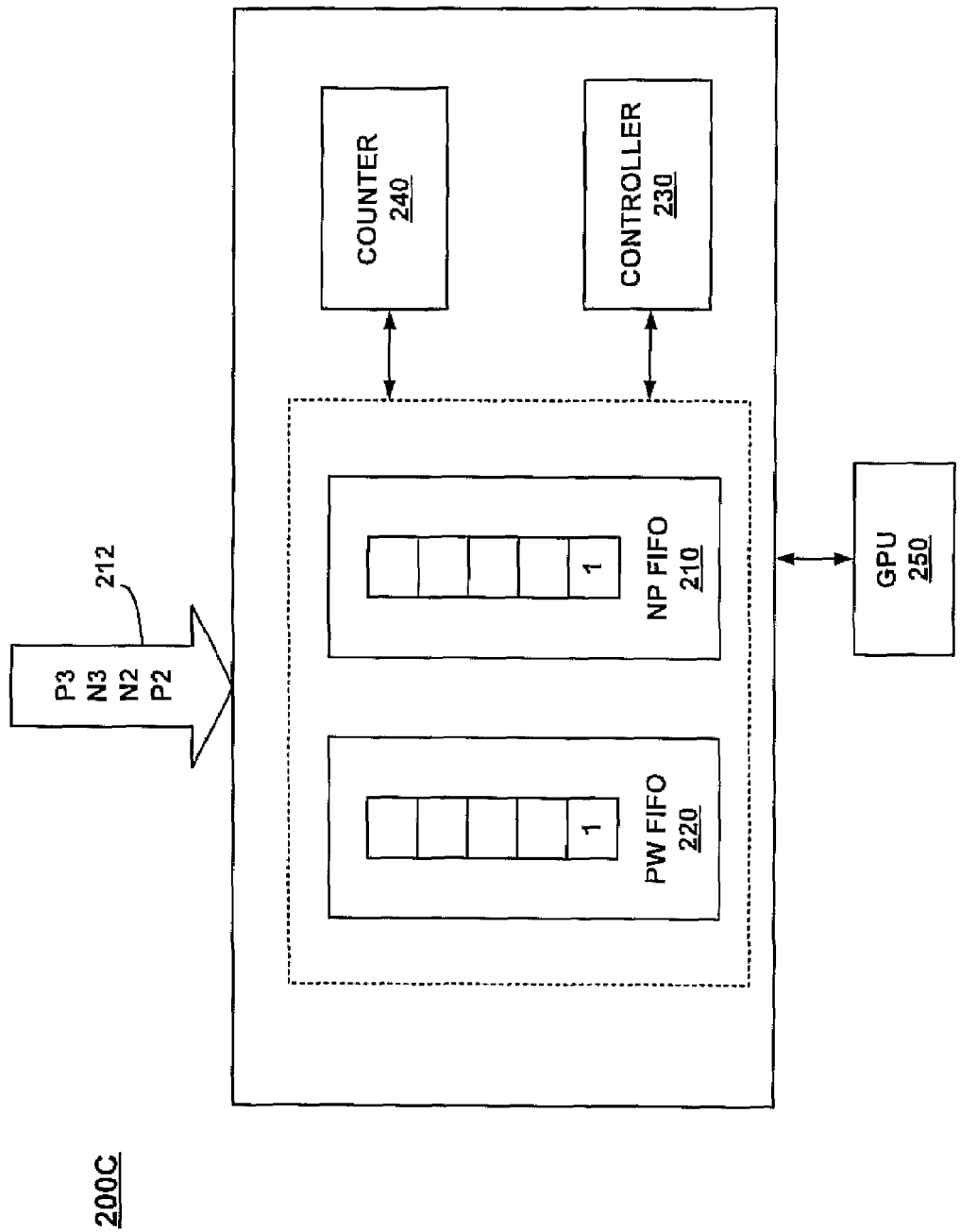

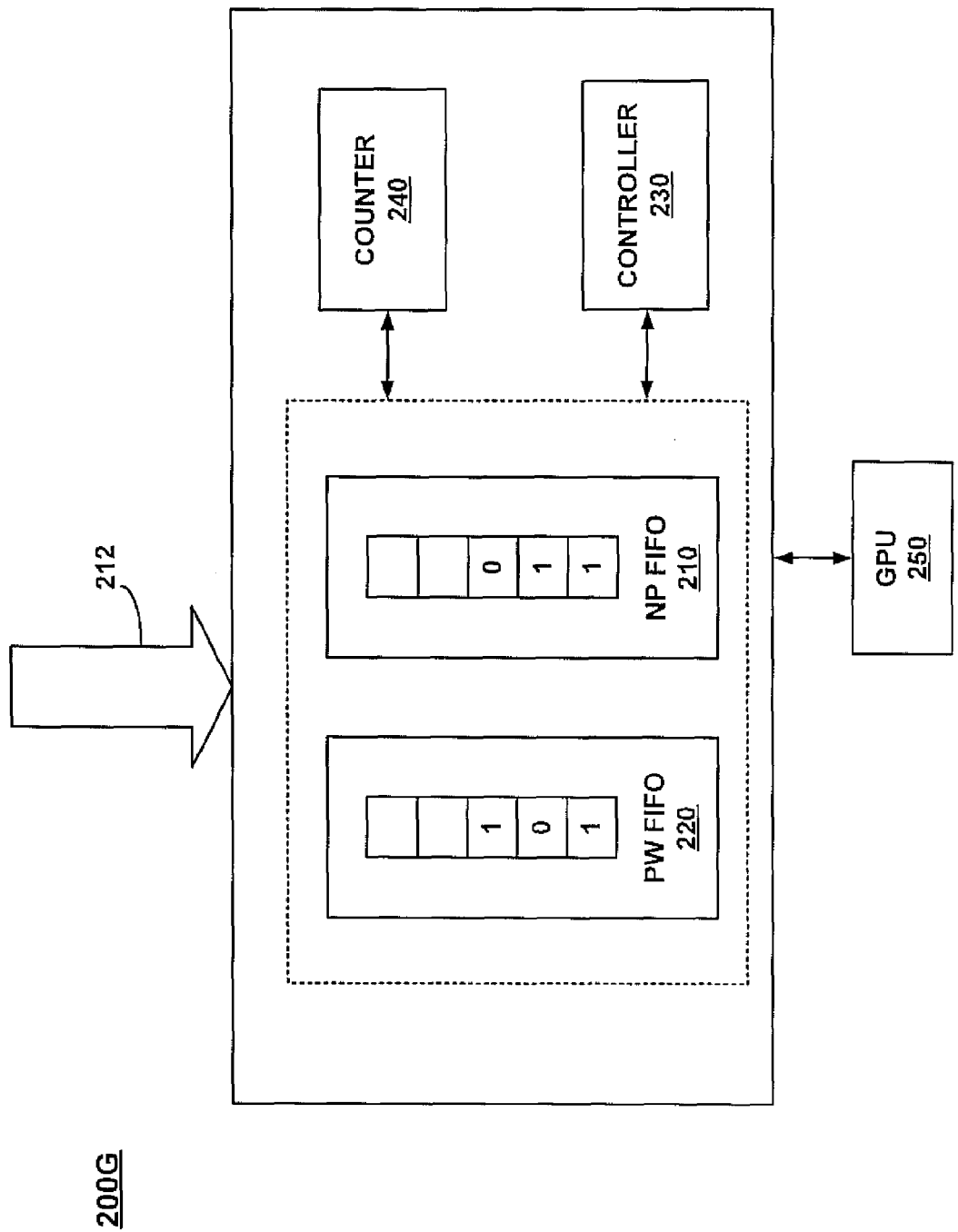

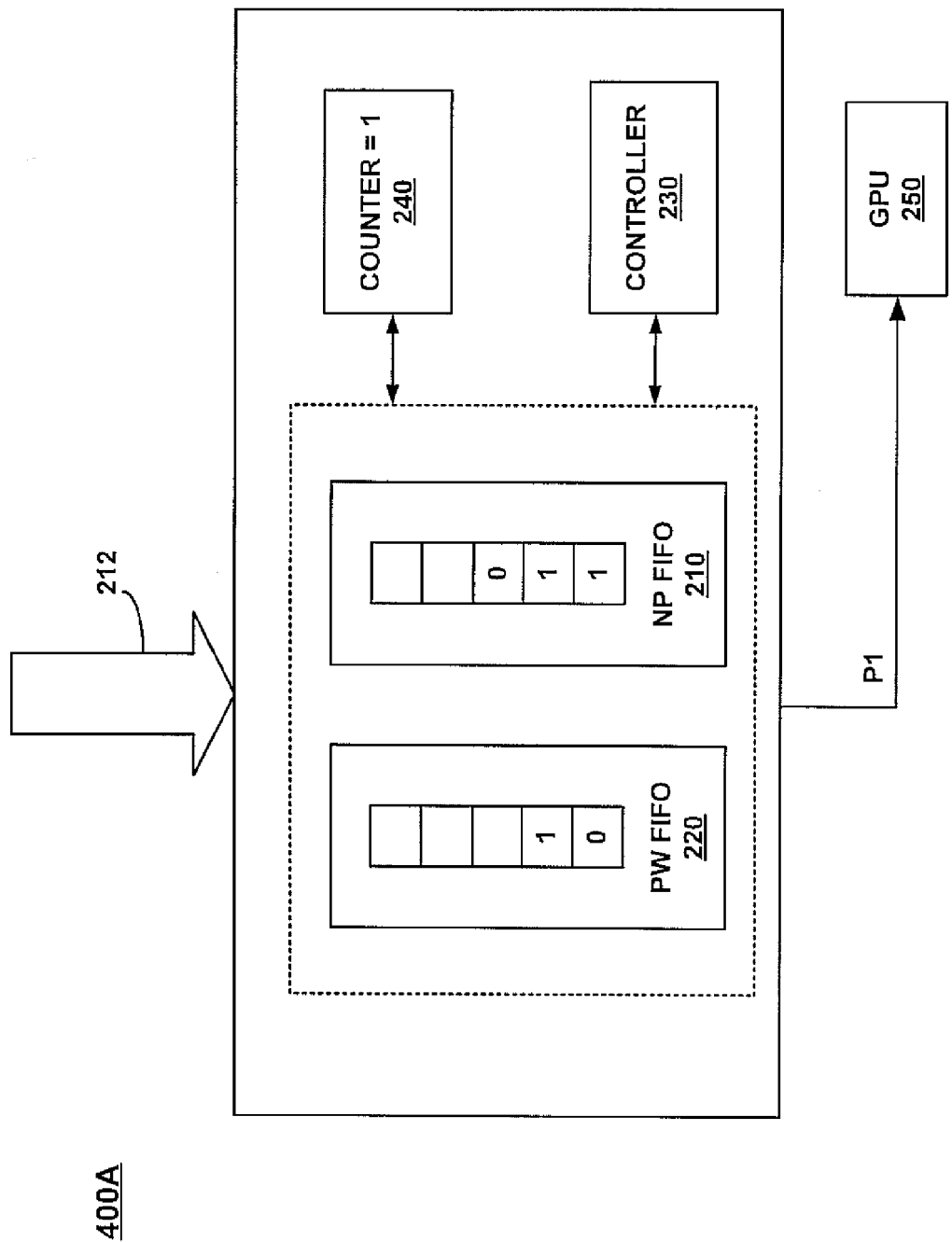

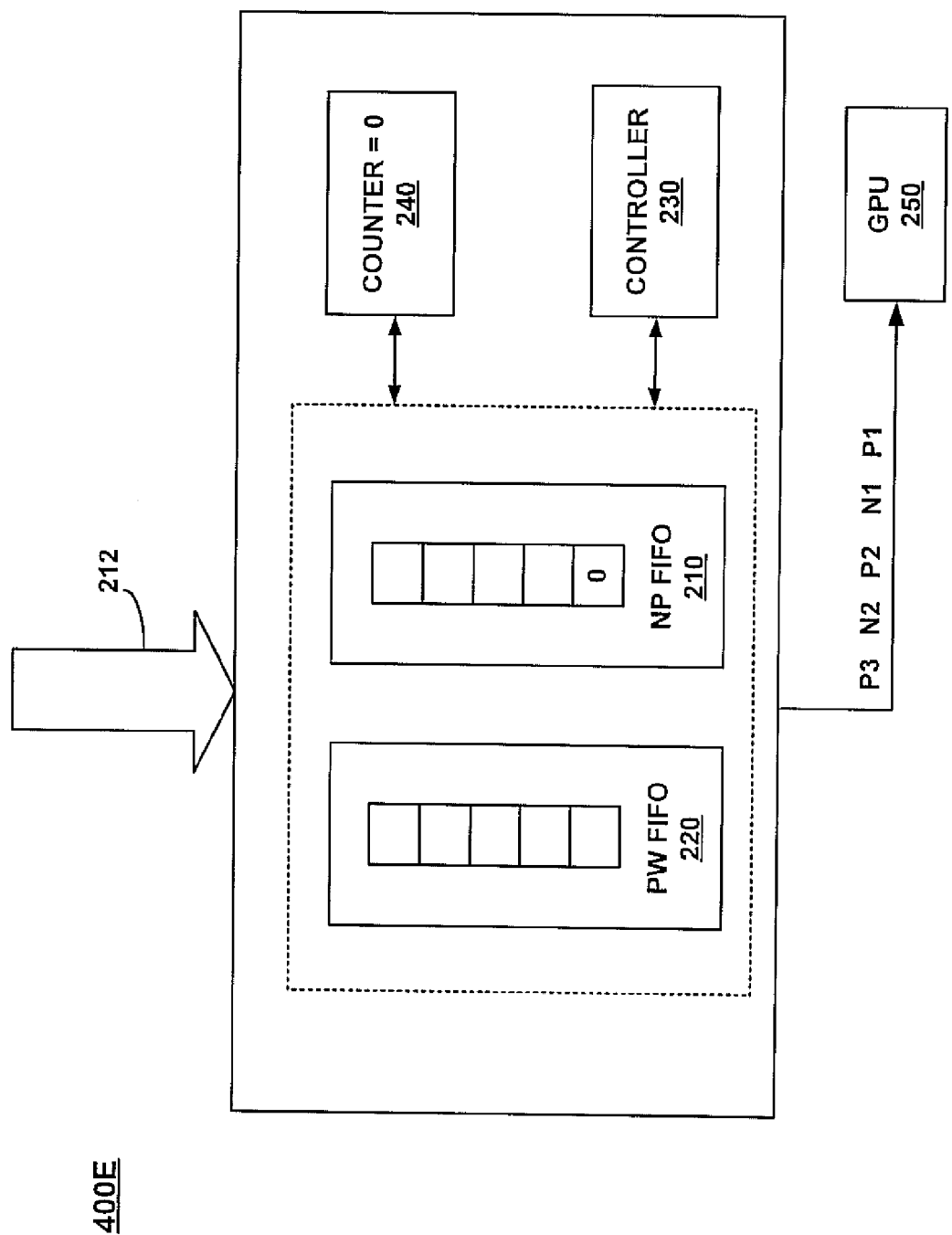

600B

Ordering a posted packet for transmission prior to a non-posted packet if a value of the counter is negative and a transition value associated with the non-posted packet is the first transition value that indicates a transition
642

Ordering either a posted packet or a non-posted packet if a value of the counter is non-negative or if a value of the counter is negative and a transition value associated with a non-posted packet is the second transition value that indicates no transition
644

FIGURE 6B

METHOD AND SYSTEM FOR ORDERING POSTED PACKETS AND NON-POSTED PACKETS TRANSFER

TECHNICAL FIELD

The embodiments of the present invention relate to the field of electronics. More particularly, embodiments of the present invention relate to ordering of packets across a system bus.

BACKGROUND ART

In general, a system bus, e.g. north bridge, south bridge, peripheral component interconnect (PCI) bus, etc., may be used for transferring packets and transactions. Packets may be posted write packets or non-posted write packets. Posted write packets receive acknowledgement signals but non-posted packets do not receive acknowledgement signals.

A system bus in a host or a peripheral bus, e.g., hyper transport, PCI express, PCI extended, front side bus, advance microcontroller bus architecture, etc., requires certain ordering for different packets. For example, in one conventional system a non-posted packet cannot be transmitted ahead of a posted packet if the posted packet originated before the non-posted packet.

Referring now to FIG. 1, a conventional system 100 is shown for ensuring that posted packets that originated before non-posted packets are transmitted ahead of the non-posted packets. The conventional system 100 comprises an input bus, a first random access memory (RAM) 110 and a second RAM 120. The first RAM 110 stores non-posted packets. For example, N1 packet may be stored in location 0 and N2 packet may be stored in location 1.

The address at which the last non-posted packet is stored is used to tag posted packets arriving after the last non-posted packet. The tag corresponds to the address location at which the last non-posted packet is stored. For example, the address 0 for the non-posted packet N1 is used to tag posted packets P1 and P2 arriving after the non-posted packet N1. The posted packets P1 and P2 are each stored in their corresponding locations, e.g., address 0 and 1 respectively, in the second RAM 120 along with their tags, e.g., tag=0.

A non-posted packet, e.g., N2, may be received after the posted packet P2. Accordingly, the non-posted packet N2 is stored in the first RAM 110 in location 1. The address at which the non-posted packet N2 is stored is used to tag posted packets arriving after the non-posted packet N2, e.g., posted packet P3. As such, when posted packet P3 is received, it may be stored in the second RAM 120, e.g., address 2, along with its corresponding tag, e.g., tag=1. The tags stored along with posted packets are used to ensure that posted packets that originated before the non-posted packets are transmitted ahead of the non-posted packets originating after.

According to one enforcement rule, a non-posted packet can be transmitted ahead of a posted packet as long as the tag associated with the posted packet indicates that the posted packet was received after the non-posted packet. According to another rule, a non-posted packet can be transmitted if the RAM 120 storing posted packets is empty. For example, the ordering of packets received may be N1, P1, P2, N2 and P3 whereas the ordering of packets read may be N1, P1, P2, P3, N2 or P1, P2, P3, N1, N2 or P1, N1, P2, P3, N2 or P1, N1, P2, N2, P3, for instance.

Unfortunately, tagging posted packets with the address at which the last non-posted packet is stored increases the amount of storage required to implement the scheme. For example, tagging posted packets with the address at which the last non-posted packet is stored requires more flip-flops to store the tags and the addresses in comparison to storing the packets alone. As a result, the amount of storage, complexity and cost increase.

Unfortunately, using the same RAM for both non-posted packets and posted packets is not possible for conventional tagging. As a result, the number of required RAMs increases which increases manufacturing cost and complexity. Moreover, conventional tagging is difficult for packets received from different system buses because ordering enforcement is not feasible between different system buses. Additionally, conventional tagging becomes very difficult if the address at which the last non-posted packets are stored cannot be determined, e.g., when a single RAM is shared by different units.

SUMMARY

Accordingly, a need has arisen to order packets, e.g., posted and non-posted, without tagging posted packets with the address at which the last non-posted packet is stored. Furthermore it is desirable to have the flexibility to order packets using one memory component, e.g., RAM. Moreover, a need has arisen to order packets in a system where packets are received from different system buses. It is also advantageous to have the capability to order packets when the addresses at which the non-posted packets are stored are unknown or cannot be determined. It will become apparent to those skilled in the art after reading the detailed description of the present invention that the embodiments of the present invention satisfy the above mentioned needs.

According to one embodiment, packets, e.g., posted and non-posted, are first received. For every non-posted packet following a posted packet, a first transitional value, e.g., 1, may be stored in a first in first out (FIFO) stack for received non-posted packets. Similarly, for every posted packet received following a non-posted packet transition, the first transitional value, e.g., 1, may be stored in a FIFO stack for posted packets. It is appreciated that the FIFO stacks for the posted packets and non-posted packets may be within a same FIFO stack that is partitioned. Each time that there is no transition between a posted packet to non-posted packet or vice versa, a second transitional value, e.g., 0, may be stored in the appropriate FIFO stack. It may be presumed that a packet prior to the first received packet is a posted packet. However, it is appreciated that the presumption may be that a packet prior to the first received packet is a non-posted packet.

Packets are ordered when they are read out. At first, a counter value is zero. A posted packet is transmitted if the posted packet has the second transitional value and when the counter value is zero. On the other hand, either a posted packet or a non-posted packet may be transmitted when the counter value is zero and when the posted packet has the first transitional value. The counter value is incremented when a posted packet with the first transitional value is transmitted. On the other hand, the counter value is decremented when a non-posted packet with the first transitional value is transmitted. When there is no transition, e.g., a posted packet followed by another posted packet, the counter value is unchanged.

A posted packet is transmitted when a counter value is negative. However, either a posted packet or a non-posted packet may be transmitted when a counter value is positive.

Accordingly, packets are ordered without needing to tag posted packets with the address at which the last non-posted packet is stored, thereby reducing storage requirements and complexity. Furthermore, storing a one bit transitional value, e.g., 0 or 1, reduces the amount of storage needed. Moreover, employing transitional bit values and the enforcement rules according to embodiments of the present invention enable ordering of packets without using the addresses at which posted or non-posted packets are stored. Furthermore, ordering of received packets from different system buses is possible in accordance with embodiments of the present invention since the addresses at which posted or non-posted packets are stored are no longer needed.

More particularly, a system for ordering between posted packets and non-posted packets includes a first memory, a second memory, a counter and a controller. The first memory may store transition information for posted packets. The second memory may store transition information for non-posted packets. The counter is incremented in response to detecting a transition in the transition information for posted packets in the first memory and decrementing in response to detecting a transition in the transition information for non-posted packets in the second memory. The controller may order packets based on a counter value and further based on transition information in the first memory and the second memory.

According to one embodiment, the first memory stores a first value when a posted packet is received after a non-posted packet and stores a second value when a posted packet is received after a posted packet. The counter is incremented in response to detecting the first value when the posted packet is read. The second memory stores a first value when a non-posted packet is received after a posted packet and stores a second value when a non-posted packet is received after a non-posted packet. The counter is decremented in response to detecting the first value when the non-posted packet is read.

In one embodiment, the controller orders a posted packet for transmission prior to a non-posted packet if a value of the counter is negative or if a value of the counter is zero and the transition information from the first memory indicates no transition from a non-posted packet to a posted packet. Otherwise, the controller orders either a posted packet or a non-posted packet. It is appreciated that the first memory and the second memory may be within different partitions of a same memory component. According to one embodiment, a value stored by the first memory and the second memory is a one bit value. The first memory and the second memory may be implemented as first in first out (FIFO) stacks.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIGS. 2A, 2B, 2C, 2D, 2E, 2F and 2G show an exemplary system for loading transitional information associated with posted packets and non-posted packets in accordance with one embodiment of the present invention.

FIGS. 4A, 4B, 4C, 4D, 4E and 4F show an illustrative example of transmitting packets based on transitional information of non-posted and posted packets in accordance with one embodiment of the present invention.

FIGS. 6A and 6B show an exemplary flow diagram for loading transitional information and transmission of packets based on the transitional information in accordance with one embodiment of the present invention.

DETAILED DESCRIPTION

Figure 1:
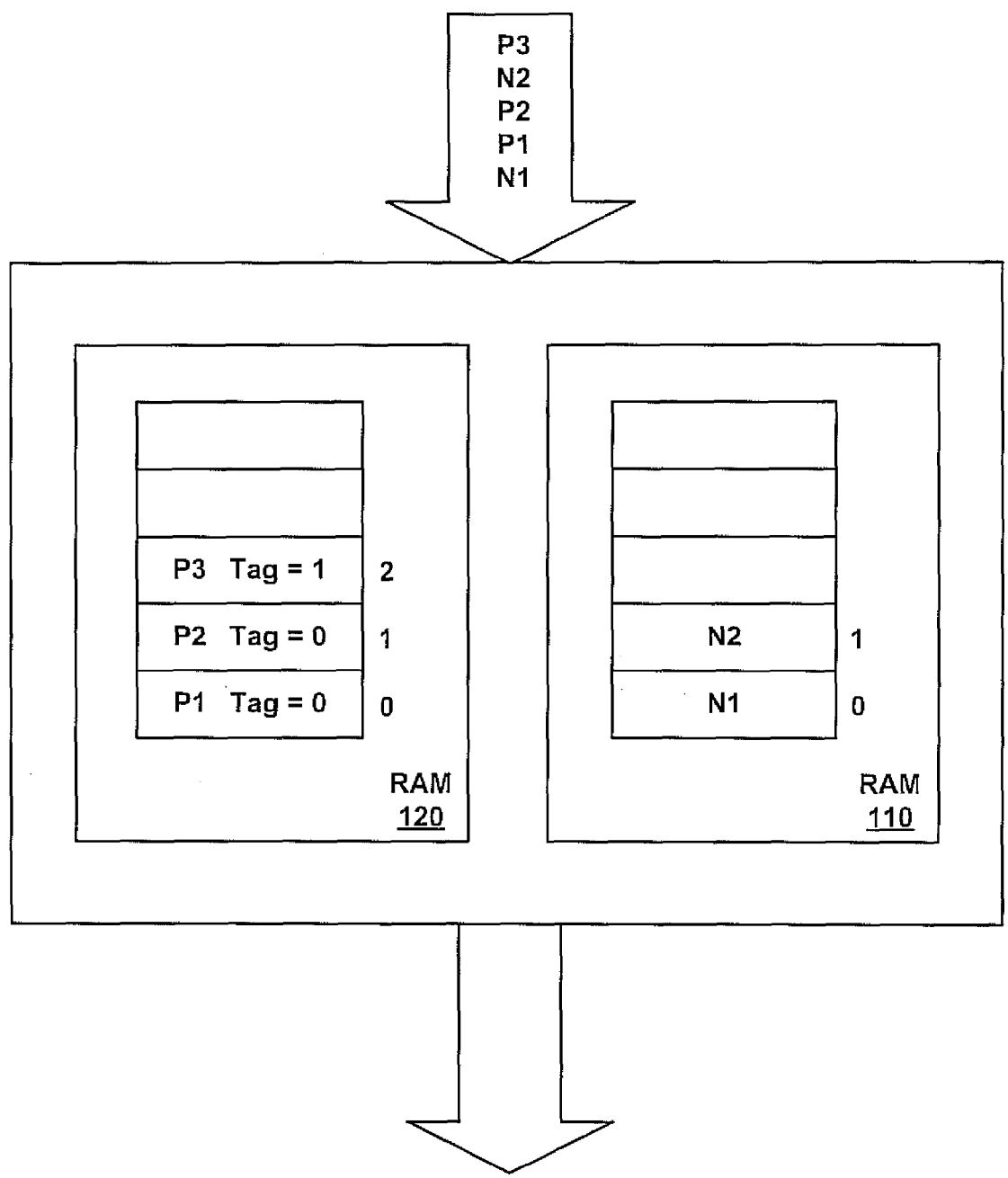
FIG. 1 shows a prior art system for ensuring that posted packets originated before non-posted packets are transmitted ahead of non-posted packets.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "clearing" or "accessing" or "obtaining" or "selecting" or "calculating" or "measuring" or "querying" or "receiving" or "sending" or "providing" or "storing" or "incrementing" or "ordering" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Ordering Posted Packets and Non-Posted Packets Transfer

Figure 2A:
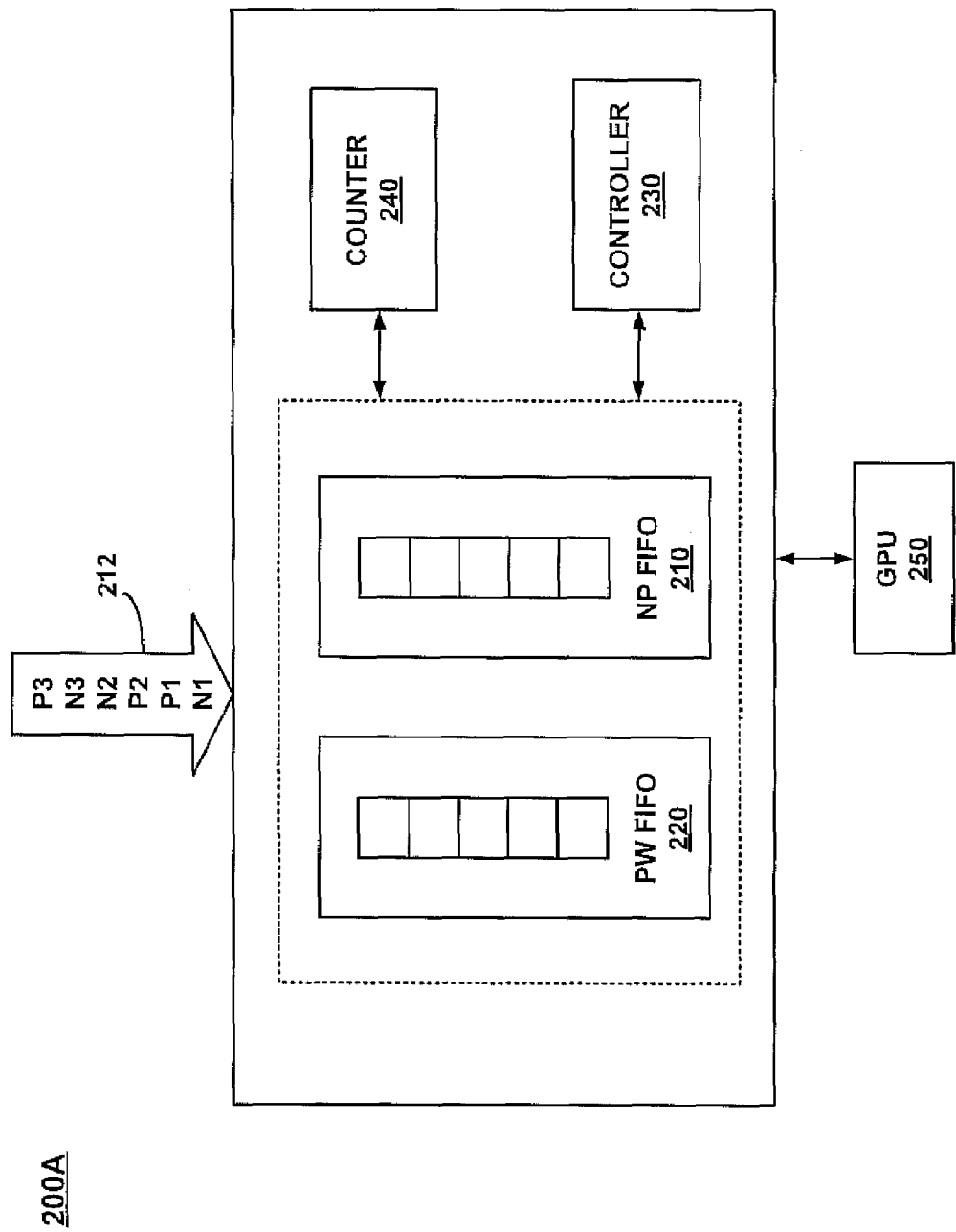
Figure 2B:
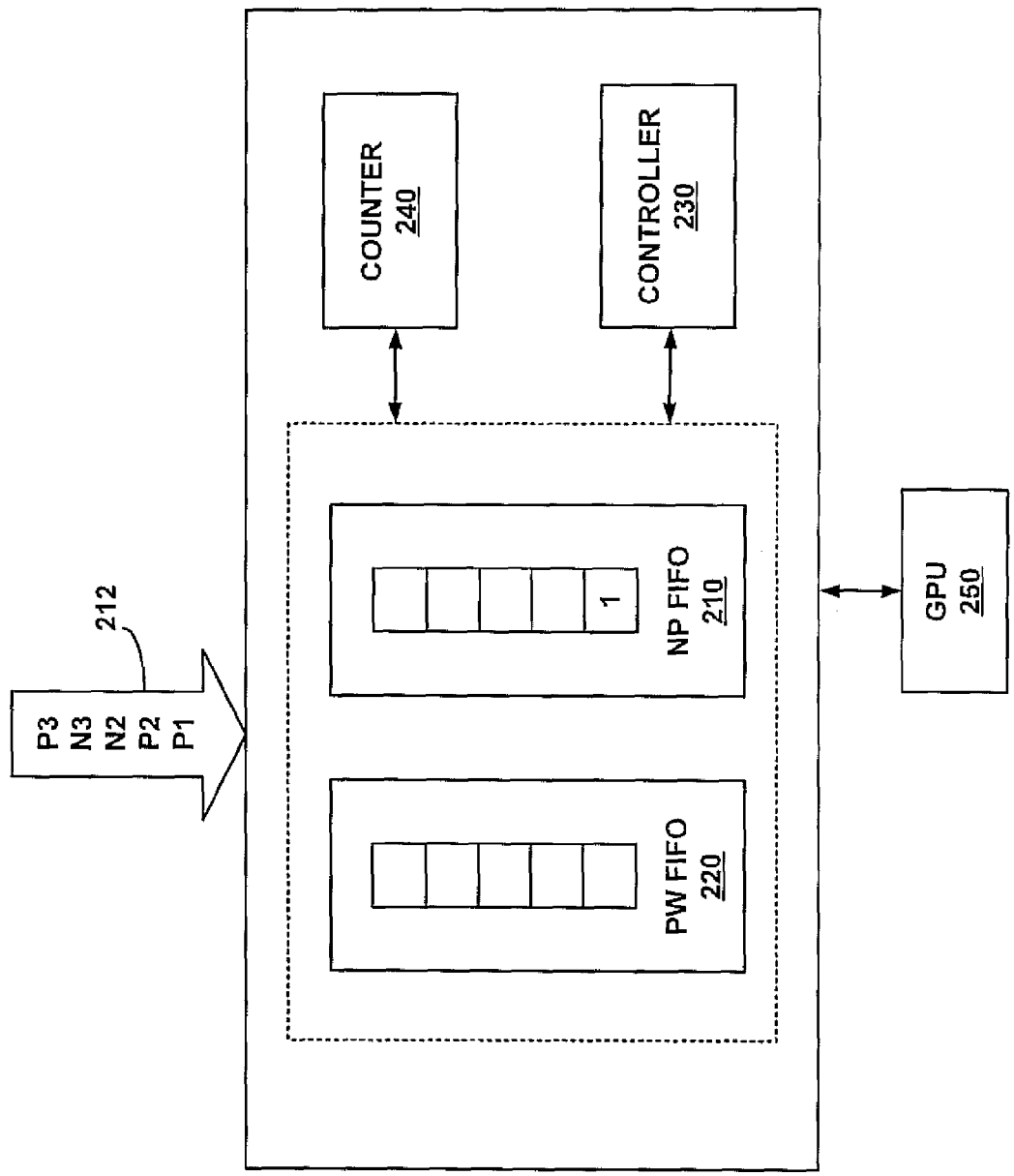

Referring now to FIG. 2A, an exemplary system for loading transitional information associated with first type packets and second type packets in accordance with one embodiment of the present invention is shown. It is appreciated that a first type packet may be a posted packet and a second type packet may be a non-posted packet. The system 200A comprises a system bus 212, a posted write (PW) first in first out (FIFO) 220, a non-posted (NP) FIFO 210, a counter 240, a controller 230, and a graphics pipeline unit (GPU) 250. It is appreciated that a component other than the GPU 250 may be used and that the use of GPU 250 is for illustrative purposes.

The system bus 212 may be used to receive packets, e.g., posted packets and non-posted packets. Non-posted packets are represented by an "N" designation and posted packets are represented by "P" designation. The packets received in this exemplary embodiment are N1, P1, P2, N2, N3 and P3 respectively.

A transitional value associated with each packet is stored in either the NP FIFO 210 or the PW FIFO 220. It is appreciated that the NP FIFO 210 and the PW FIFO 220 may be implemented as a random access memory (RAM). Moreover, according to one embodiment, the NP and PW memory components 210 and 220 may each be a one bit FIFO stack.

According to one embodiment, the NP FIFO 210 stores a one bit value, e.g., 1, for a non-posted packet that is received after a posted packet. On the other hand, the NP FIFO 210 stores a 0 bit value for a non-posted packet that is received after another non-posted packet. In other words, a bit value 1 is stored if there is a transition from a posted packet to a non-posted packet and a bit value 0 is stored if there is no transition. It is appreciated that use of the bit values "1" and "0" is exemplary and not intended to limit the scope of the present invention. For example, in an alternate embodiment the values could be reversed, e.g., a bit value "0" may be used to represent a transition from a posted packet to a non-posted packet.

The PW FIFO 220 operates similar to the NP FIFO 210. For example, the PW FIFO 220 stores a bit value 1 for a posted packet that is received after a non-posted packet. On the other hand, the PW FIFO 220 stores a bit value 0 for a posted packet that is received after another posted packet. In other words, a bit value 1 is stored if there is a transition from a non-posted packet to a posted packet and a bit value 0 is stored if there is no transition. It is appreciated that using the bit values "1" and "0" are exemplary and not intended to limit the scope of the present invention. For example, in an alternate embodiment the values could be reversed, e.g., a bit value "0" may be used to represent transition from a posted packet to a non-posted packet.

Referring now to FIGS. 2B-2G, an example of loading transitional information associated with posted packets and non-posted packets in accordance with one embodiment of the present invention is shown. According to one embodiment, the presumption is that a packet is a posted packet if it is received before the first packet, e.g., N1. Accordingly, receiving a non-posted packet N1 indicates a transition from a posted packet to a non-posted packet. Thus, a transitional bit value of 1 is stored in the NP FIFO 210.

It is appreciated that the presumption may also be that a packet received before receiving the first packet is a non-posted packet in an alternate embodiment. Accordingly, the presumption that the packet received before receiving the first packet is a posted packet is exemplary and not intended to limit the scope of the present invention. After receiving the non-posted packet N1, the next packet to be received is a posted packet P1 from the system bus 212.

It is appreciated that the received packets are stored in a memory component. For example, the posted packets and the non-posted packet may be stored in a RAM component. In one embodiment, the posted packet and the non-posted packets may be stored in different memory components.

Referring now to FIG. 2C, the posted packet P1 is received. The non-posted packet N1 is received before the posted packet P1. Accordingly, the bit transitional value 1 is stored in the PW FIFO 220 to indicate a transition from the non-posted packet N1 to the posted packet P1. The next packet to be received is a posted packet P2 from the system bus 212.

Figure 2D:
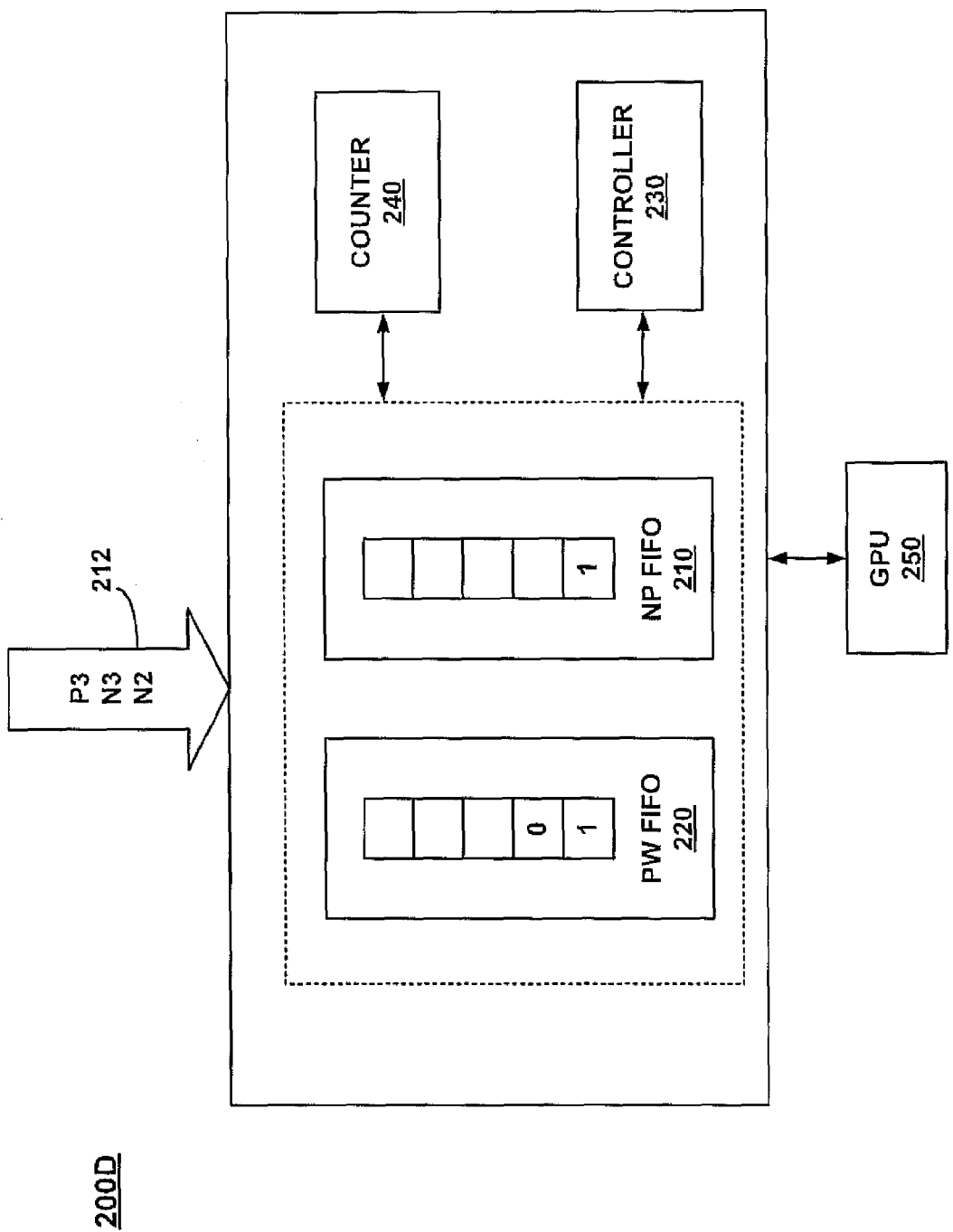

Referring now to FIG. 2D, the posted packet P2 is received. The packet that was received before the posted packet P2 is the posted packet P1. Accordingly, the bit transitional value 0 is stored in the PW FIFO 220 to indicate no transition. The next packet to be received is a non-posted packet N2 from the system bus 212.

Figure 2E:
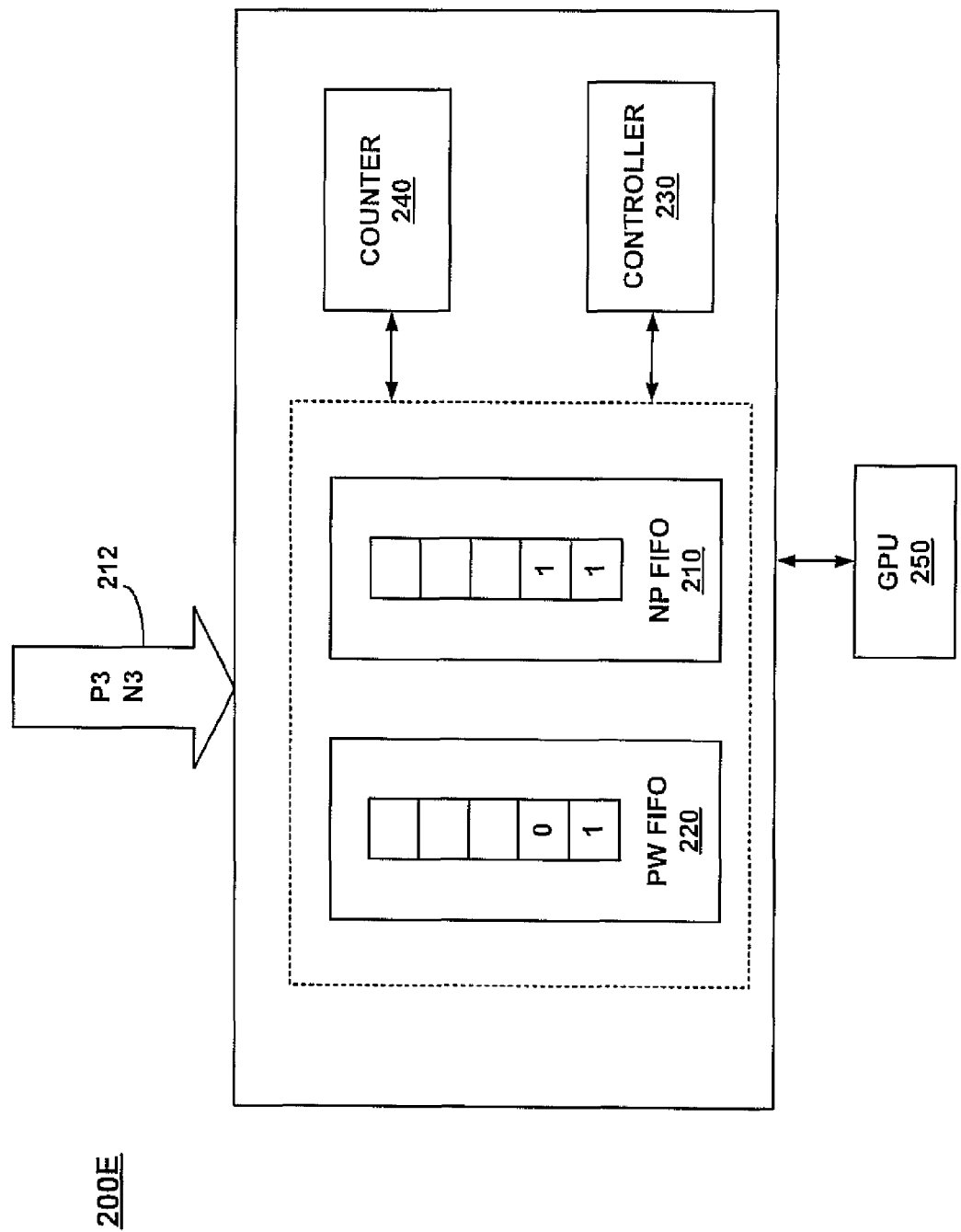

Referring now to FIG. 2E, the non-posted packet N2 is received. The non-posted packet N2 is received after the posted packet P2. Accordingly, the bit transitional value 1 is stored in the NP FIFO 210 to indicate a transition from the posted packet P2 to the non-posted packet N2. The next packet to be received is a non-posted packet N3 from the system bus 212.

Figure 2F:
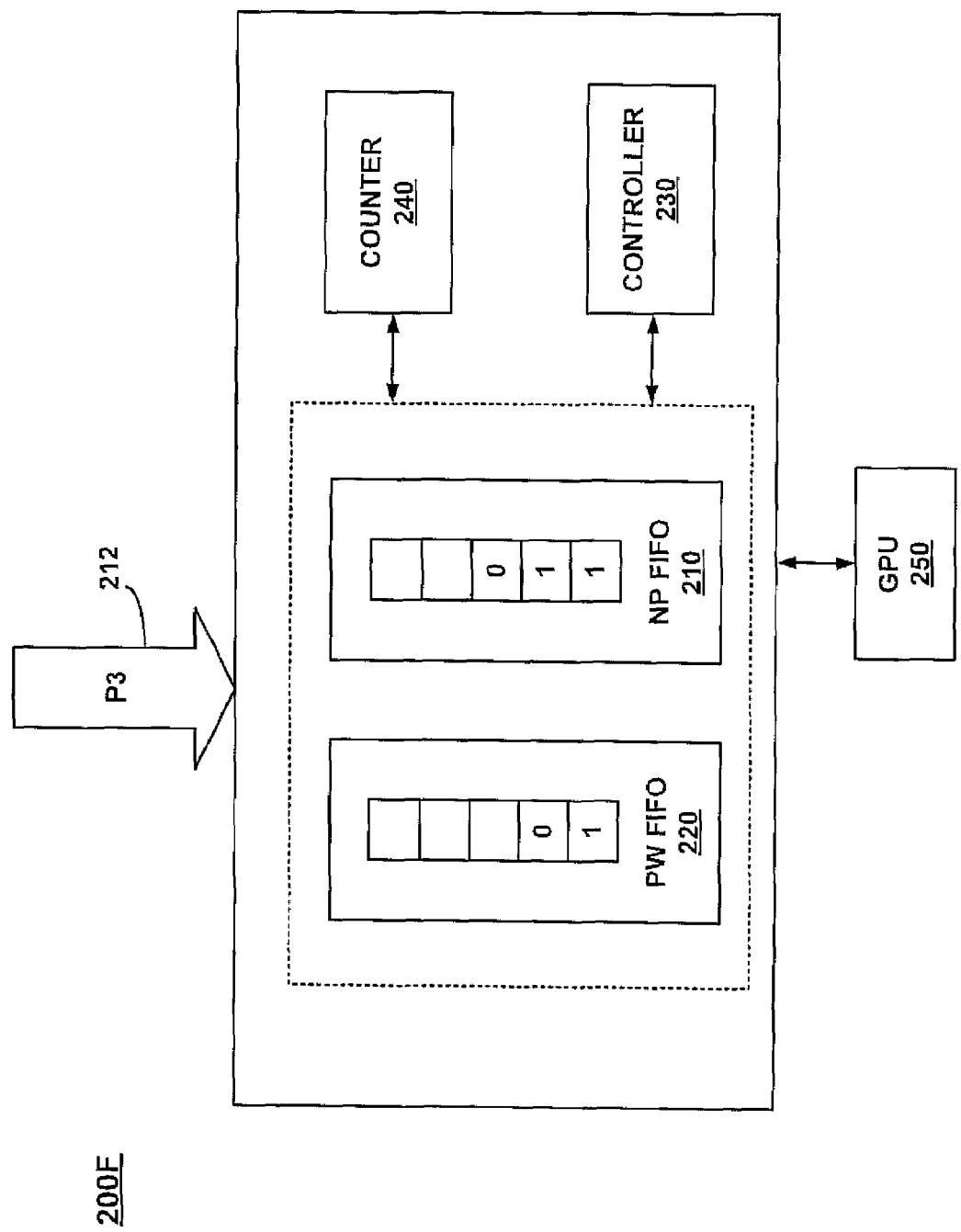

Referring now to FIG. 2F, the non-posted packet N3 is received. The non-posted packet N3 is received after the non-posted packet N2. Accordingly, the bit transitional value 0 is stored in the NP FIFO 210 to indicate no transition. The next packet to be received is a posted packet P3 from the system bus 212.

Referring now to FIG. 2G, the posted packet P3 is received. The posted packet P3 is received after the non-posted packet N3. Accordingly, the bit transitional value 1 is stored in the PW FIFO 220 to indicate a transition from the non-posted packet N3 to the posted packet P3. In this exemplary embodiment, no more packets are received.

Figure 3A:
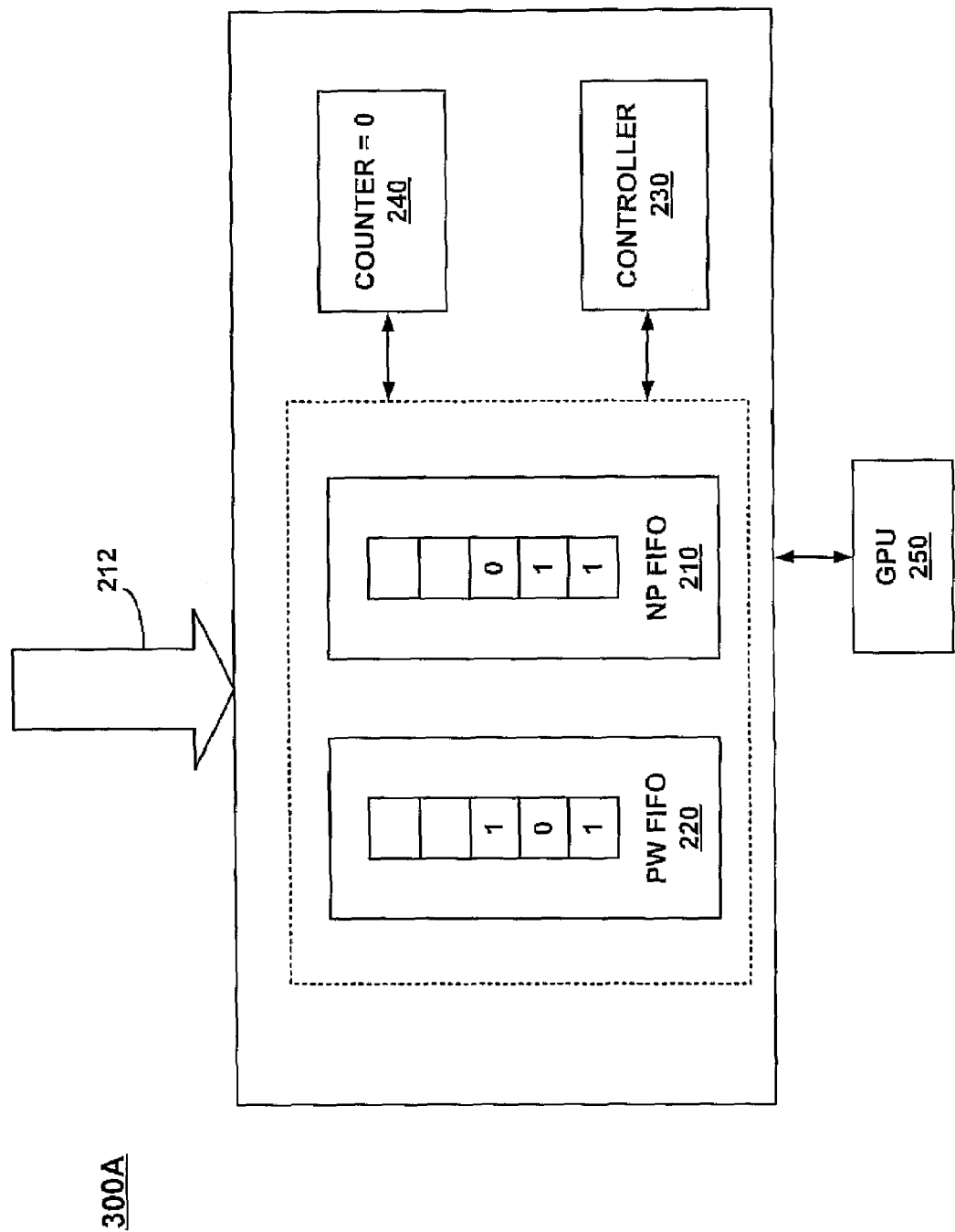
FIGS. 3A, 3B, 3C, 3D, 3E, 3F and 3G show an exemplary system for transmitting packets based on transitional information of non-posted and posted packets in accordance with one embodiment of the present invention.

Referring now to FIG. 3A, an exemplary system for transmitting packets based on transitional information of non-posted and posted packets in accordance with one embodiment of the present invention is shown. According to one embodiment, the value of the counter 240 is zero before transmitting any packets. In one embodiment, the controller 230 controls the flow of packets to other components, e.g., the GPU 250.

The controller 230 controls the flow of packets to ensure that posted packets that originated before non-posted packets are transmitted ahead of the non-posted packets. According to one embodiment, the controller 230 transmits a posted packet when the counter value is negative and a transitional value of a non-posted packet in the NP FIFO 210 is one. Otherwise, either a posted packet or a non-posted packet may be transmitted. It is appreciated that a non-posted packet may be transmitted when the PW FIFO 220 is empty.

The controller 230 increments the counter 240 value by one when a posted packet with a transitional value of 1 is read or transmitted. In contrast, the controller 230 decrements the counter 240 value by one when a non-posted packet with a transitional value of 1 is read or transmitted.

In this exemplary embodiment, the non-posted packet N1 or the posted packet P1 may be transmitted because the counter 240 value is zero and the transitional bit value of the PW FIFO 220 is one. Therefore, the controller 230 may transmit either the non-posted packet N1 or the posted packet P1.

Figure 3B:
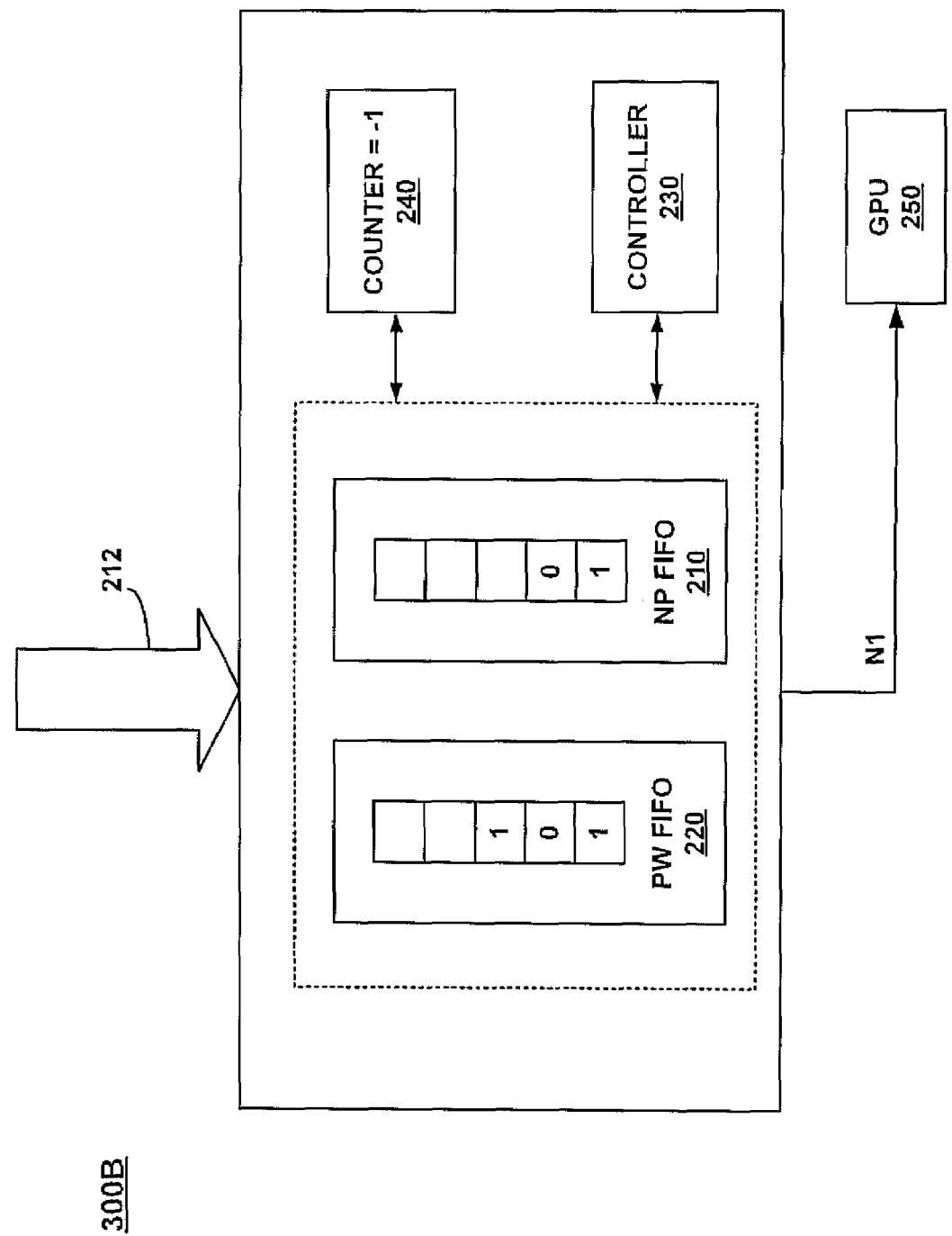

Referring now to FIG. 3B, a diagram of an exemplary transmission of packets in accordance with one embodiment of the present invention is shown. The controller 230 causes the non-posted packet N1 to be transmitted to the GPU 250. It is appreciated that the controller 230 decrements the value of the counter 240 because the transitional value of the NP FIFO 210 associated with the non-posted packet N1 is one.

Figure 3C:
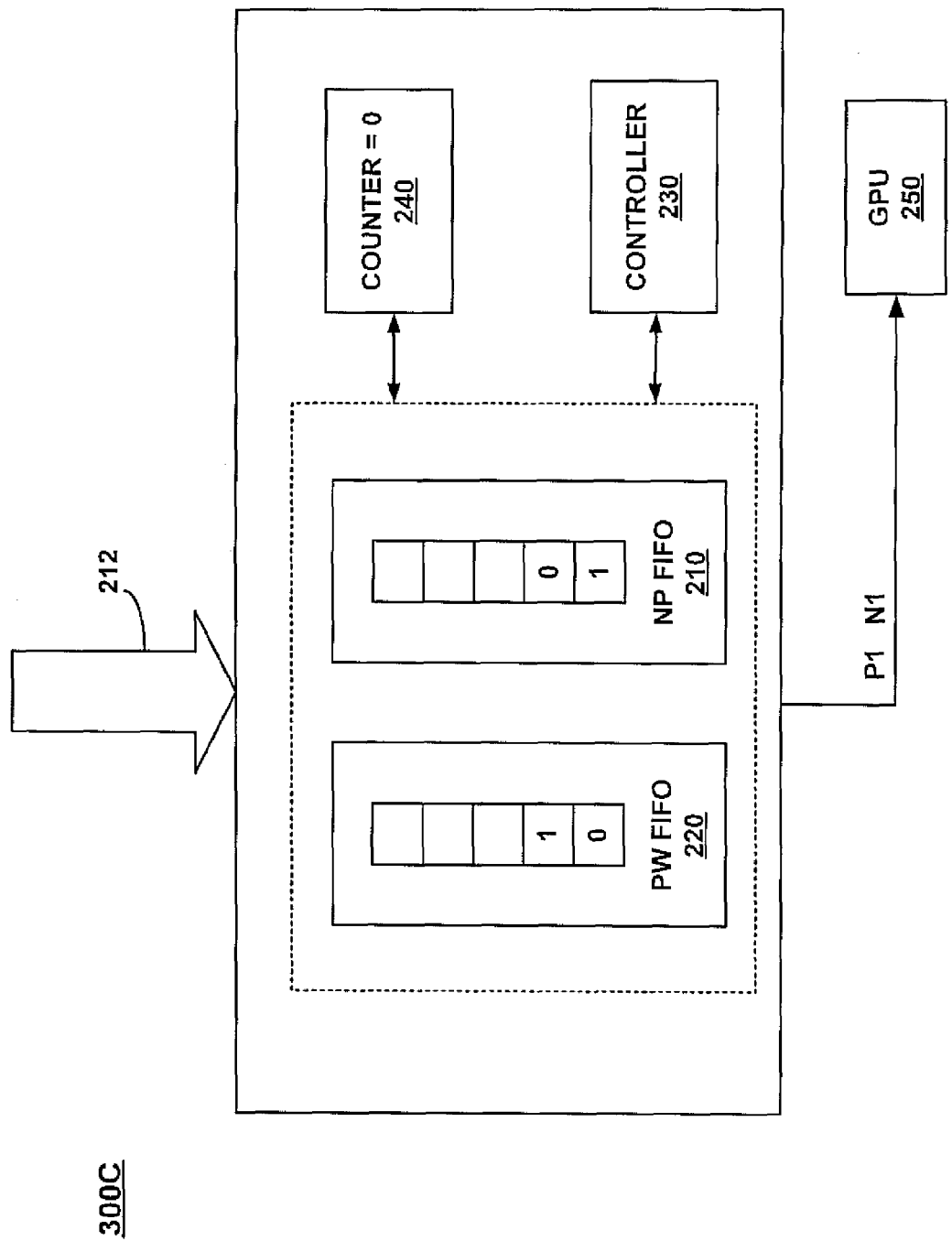

Referring now to FIG. 3C, the controller 230 causes the posted packet P1 to be transmitted because the value of the counter 240 is negative and the transitional value of the NP FIFO 210 is one. The controller 230 causes the value of the counter 240 to be incremented by one because the transitional value of the PW FIFO 220 associated with the posted packet P1 is one. Accordingly, the counter 240 value is now zero.

Figure 3D:
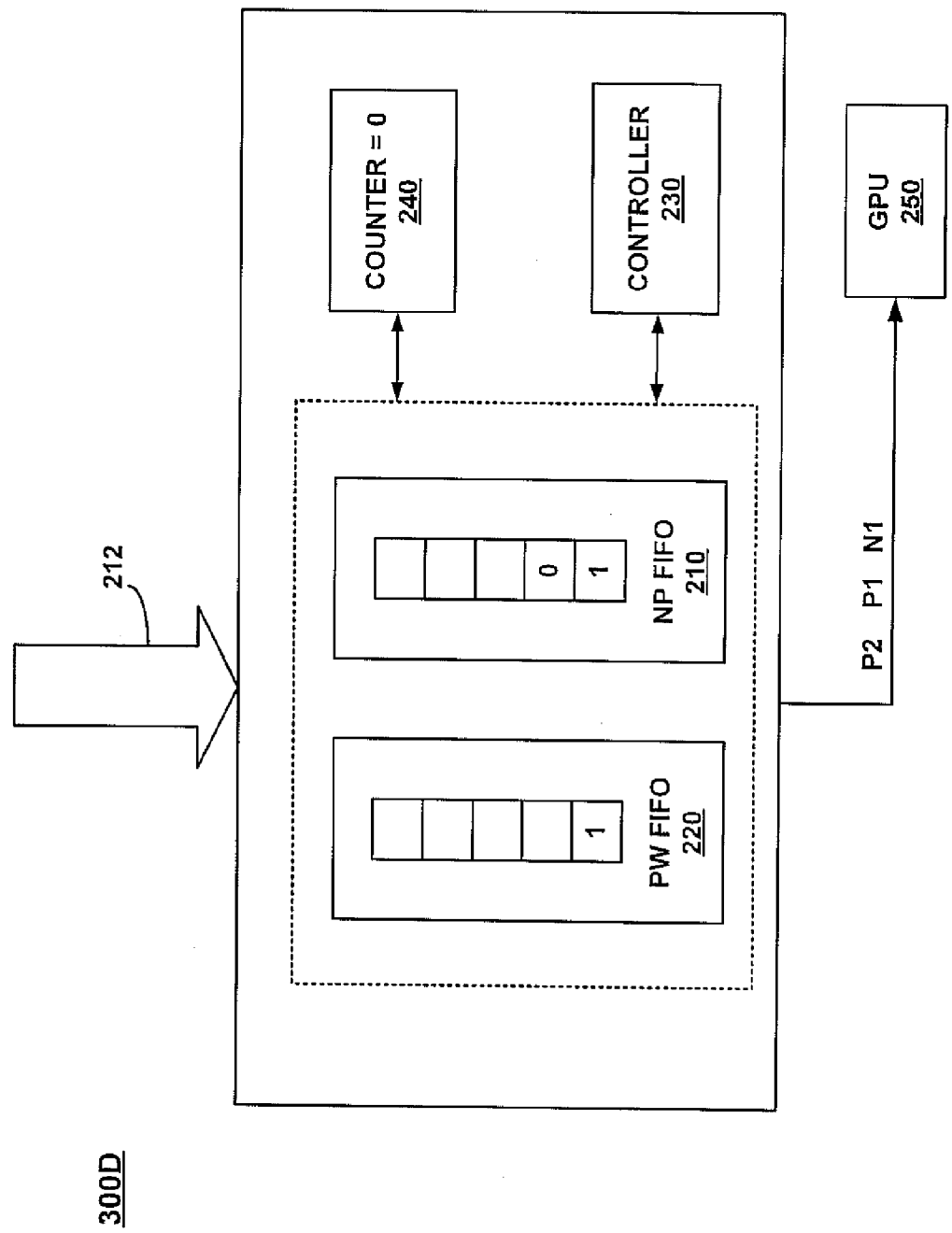

Referring now to FIG. 3D, the controller 230 may cause the posted packet P2 to be transmitted to the GPU 250 because the value of the counter 240 is zero. It is appreciated that the controller 230 does not change the value of the counter 240 because the transitional value of the PW FIFO 220 associated with the posted packet P2 is zero.

Figure 3E:
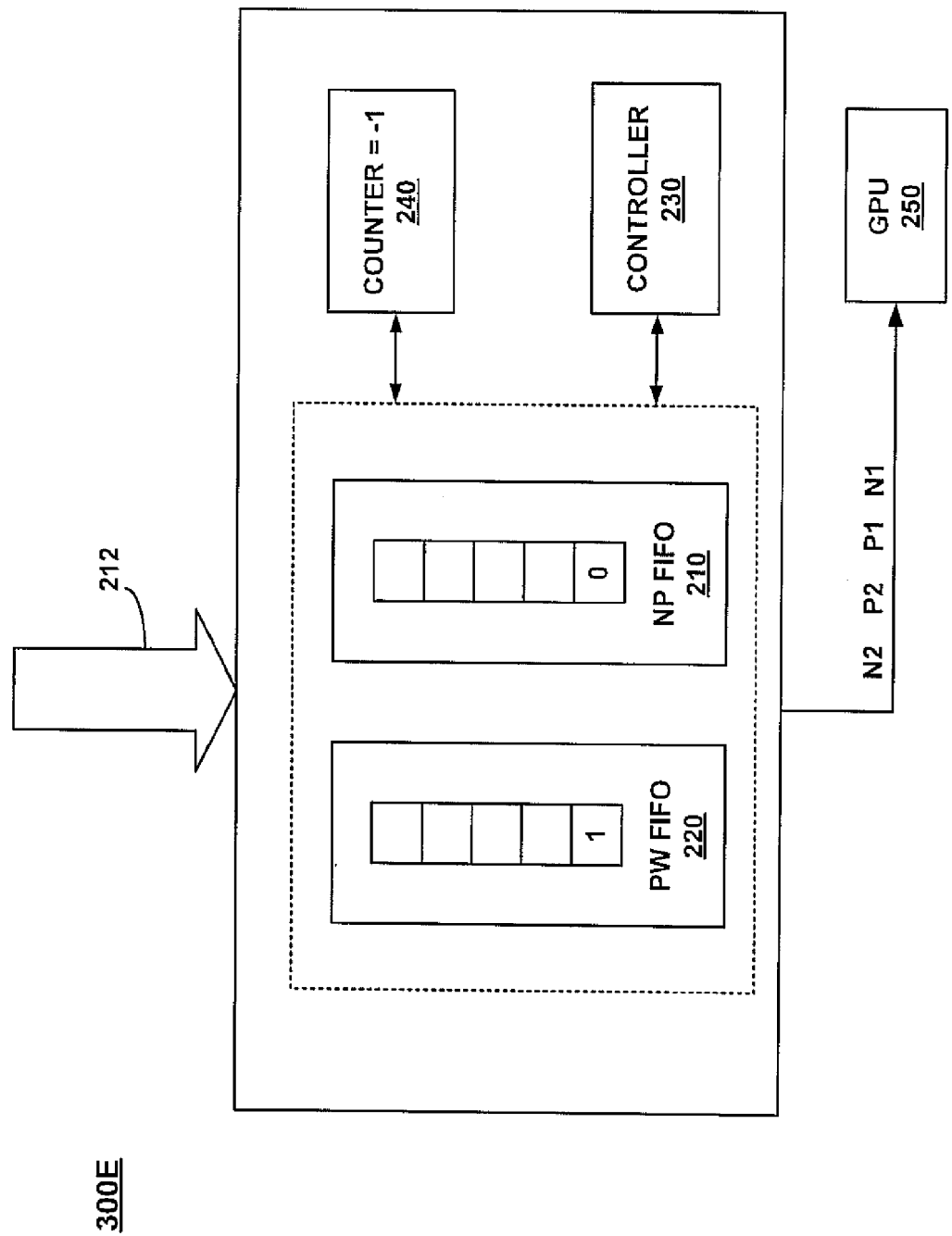

Referring to FIG. 3E, the controller 230 may cause either the posted packet P3 or the non-posted packet N2 to be transmitted to the GPU 250. Either the posted packet P3 or the non-posted packet N2 is transmitted because the counter 240 value is zero. In this example, the controller 230 transmits the non-posted packet N2. The controller 230 decrements the counter 240 value by one because the transitional value of the NP FIFO 210 associated with the non-posted packet N2 is one. The counter 240 value is therefore negative.

Figure 3F:
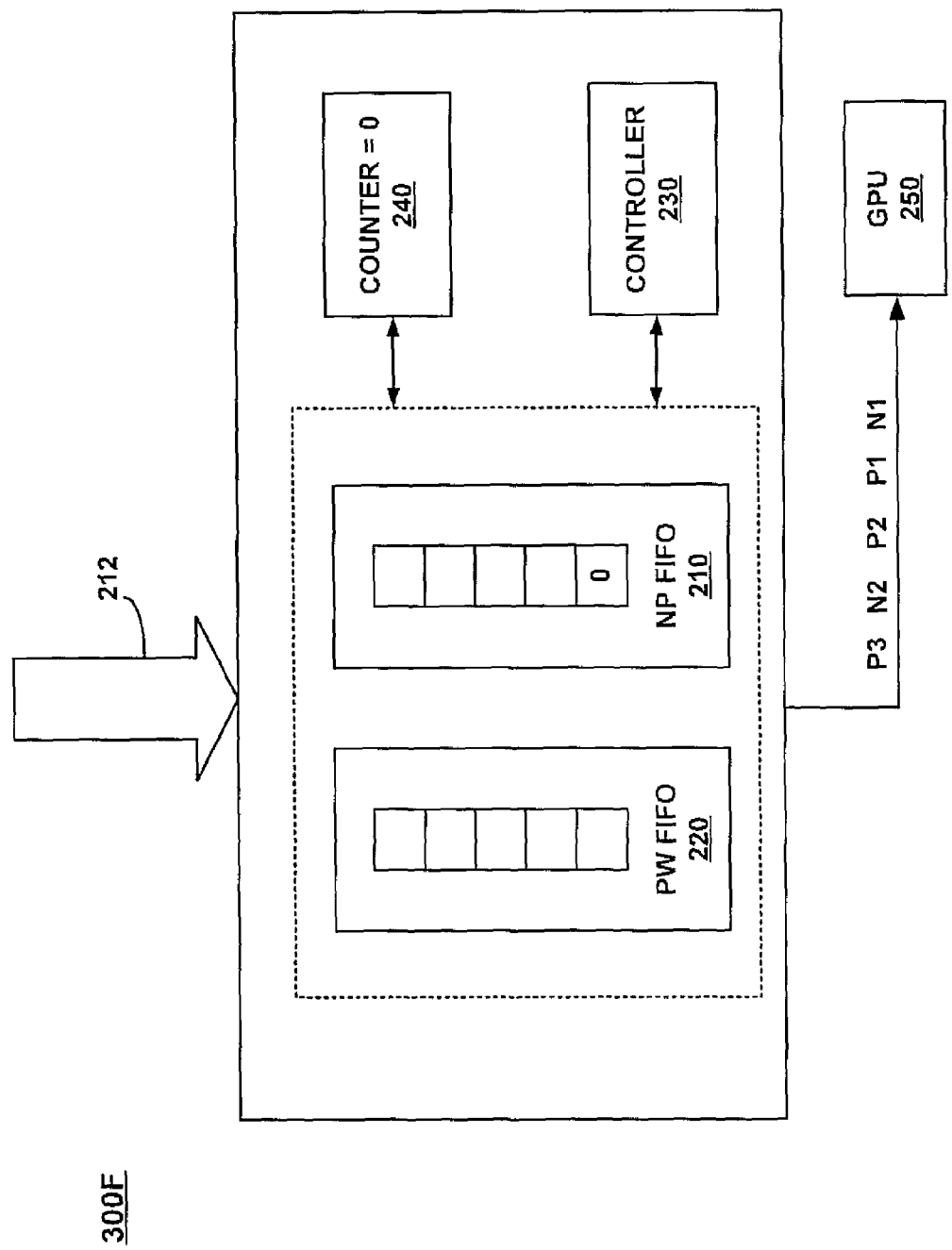

Referring to FIG. 3F, the controller 230 may cause the posted packet P3 to be transmitted because the counter 240 value is negative but the non-posted transitional value of the NP FIFO 210 is 0. The controller 230 transmits the posted packet P3 to the GPU 250. Furthermore, the controller 230 increments the counter 240 value because the posted packet P3 has a transitional value of 1 stored in the PW FIFO 220. As a result, the counter 240 value becomes zero.

Figure 3G:
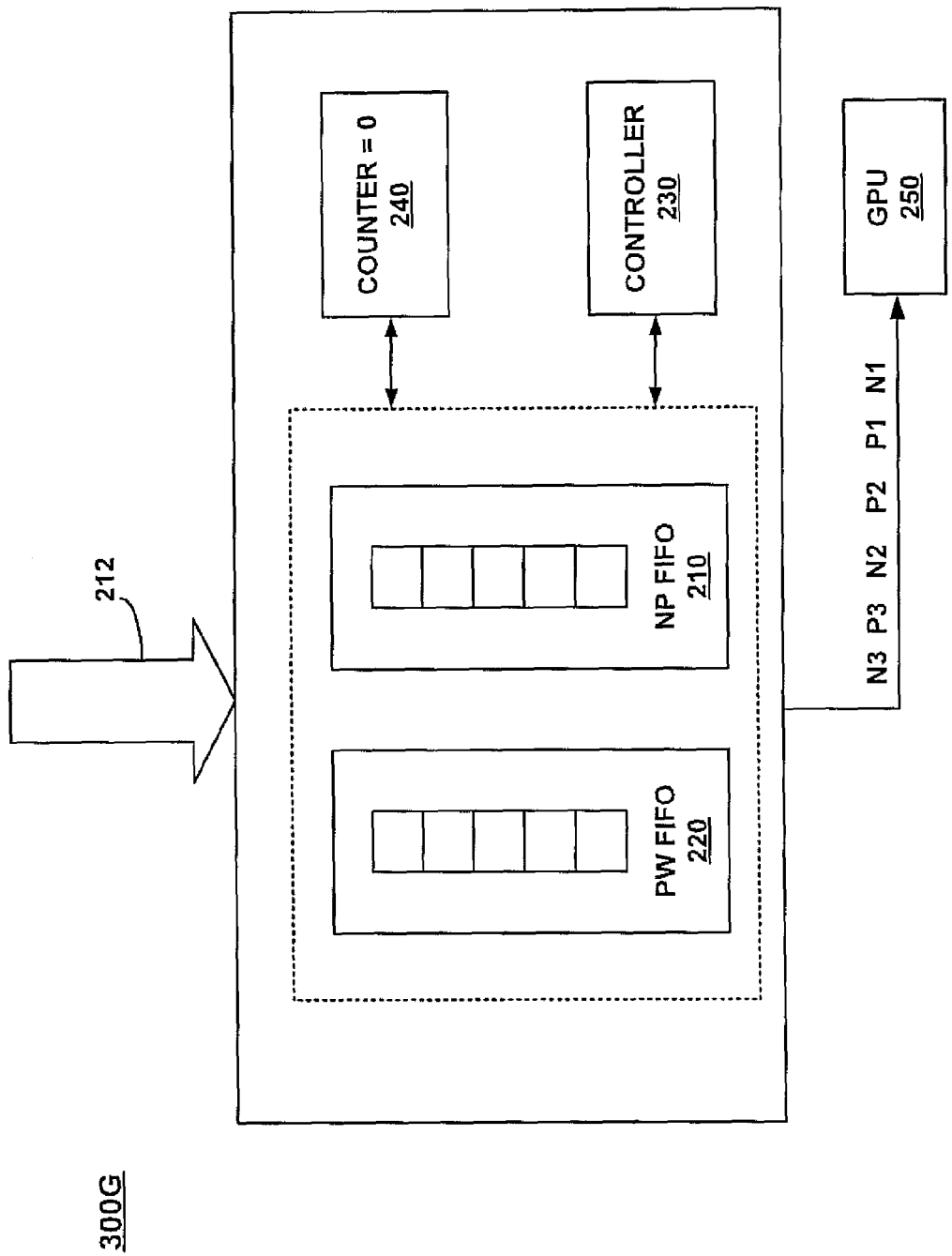

Referring now to FIG. 3G, the controller 230 transmits the non-posted packet N3 because the PW FIFO 220 is empty. It is appreciated that the counter 240 value is not changed because the transitional value of N3 is zero. Accordingly, the received packets may be N1, P1, P2, N2, N3, and P3 and the transmitted packets to the GPU 250 may be N1, P1, P2, N2, P3, and N3.

Referring now to FIGS. 4A-4F, an illustrative example of transmitting packets based on transitional information associated with non-posted and posted packets in accordance with one embodiment of the present invention is shown. In this example, it is presumed that the NP FIFO 210 stack and the PW FIFO 220 stack are filled with transitional values as packets N1, P1, P2, N2, N3, and P3 were received, as presented and discussed with respect to FIGS. 2A-2G.

As described with respect to FIG. 3A, the controller 230 may transmit either the non-posted packet N1 or the posted packet P1. In this example, the controller 230 transmits the posted packet P1 to the GPU 250. The controller 230 increments the counter 240 value by one because the posted packet P1 has a transitional value of 1 stored in the PW FIFO 220. Accordingly, the counter 240 value becomes 1.

Figure 4B:
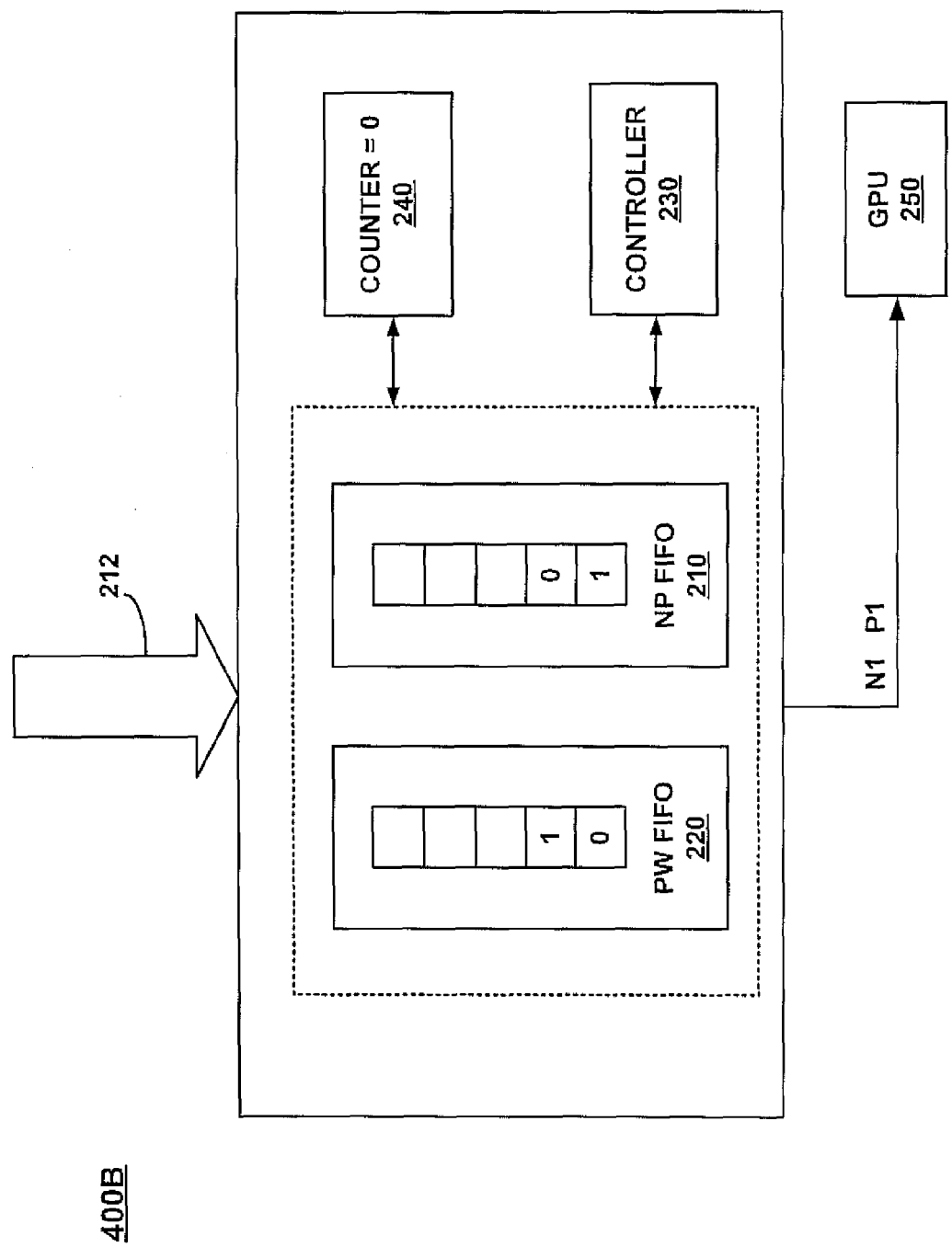

Referring to FIG. 4B, the controller 230 may transmit either a posted packet or a non-posted packet because the counter 240 value is greater than zero. In this example, the controller 230 transmits the non-posted packet N1. The controller 230 decrements the counter 240 value by one because the non-posted packet N1 has a transitional value of one stored in the NP FIFO 210. As a result, the counter 240 value becomes zero.

Figure 4C:
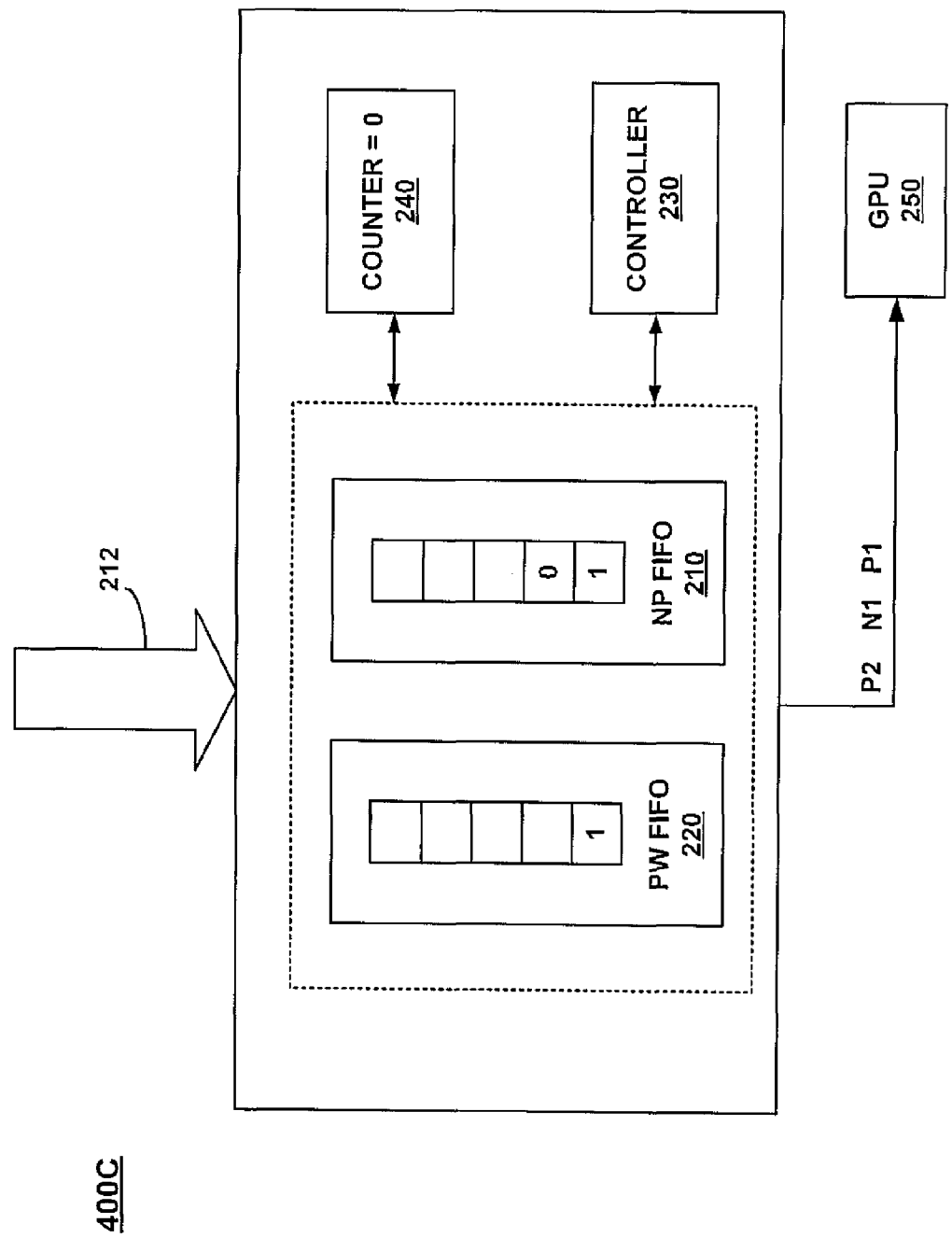

Referring now to FIG. 4C, the controller 230 may transmit a posted packet or a non-posted packet because the counter 240 value is zero. In this exemplary embodiment, the controller 230 transmits the posted packet P2 because the counter 240 value is zero. The controller 230 does not change the counter 240 value because the transitional value associated with the posted packet P2 is zero. Thus, the counter 240 value remains zero.

Figure 4D:
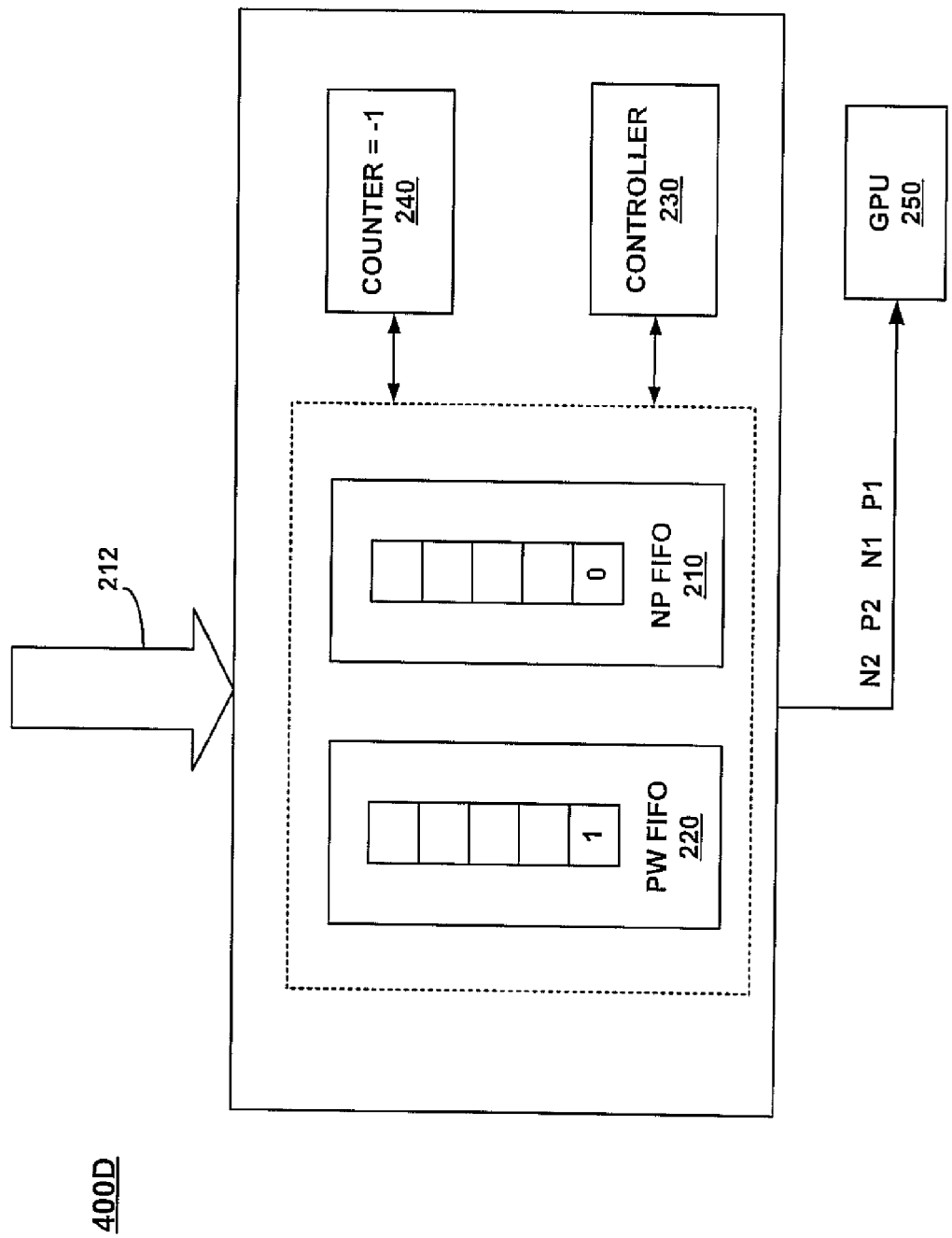

Referring now to FIG. 4D, the controller 230 may transmit either the posted packet P3 or the non-posted packet N2 because the counter 240 value is zero. In this exemplary embodiment, the controller 230 transmits the non-posted packet N2. The controller 230 decrements the counter 240 value by one because the transitional value associated with the non-posted packet N2 is one. As a result, the counter 240 value becomes negative one.

Referring now to FIG. 4E, the controller 230 may transmit either a posted packet or a non-posted packet because the counter 240 value is negative but the transitional value of the NP FIFO 210 is 0. In this exemplary embodiment, the controller 230 transmits the posted packet P3 to the GPU 250. The controller 230 increments the counter 240 value because the transitional value associated with the posted packet P3 is one. Thus, the counter 240 value becomes zero.

Figure 4F:
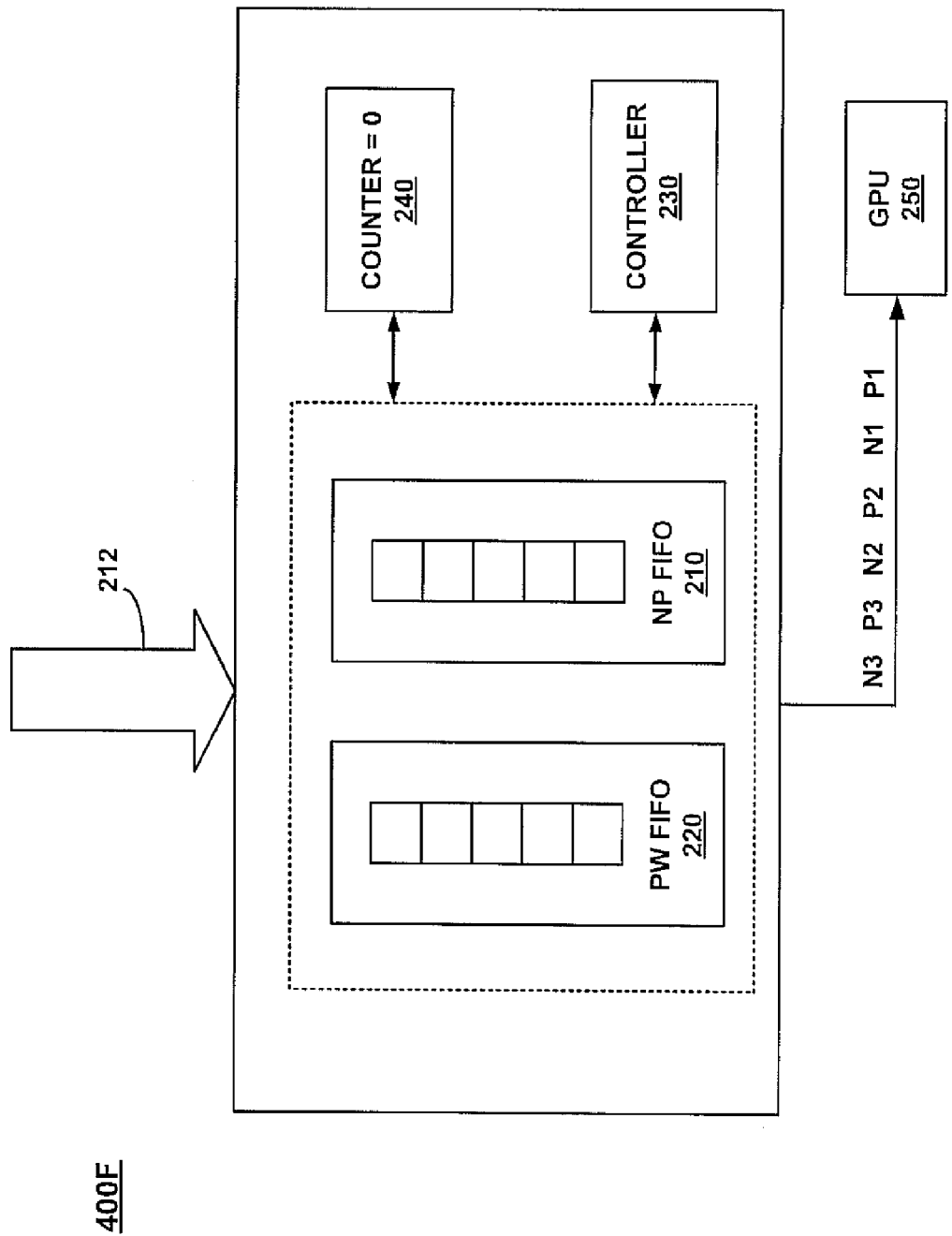

Referring now to FIG. 4F, the controller 230 transmits the non-posted packet N3 to the GPU 250 because the PW FIFO 220 is empty. The controller 230 does not change the counter 240 value because the transitional value associated with the non-posted packet N3 is zero. Accordingly, the received packets may be N1, P1, P2, N2, N3, and P3 and the transmitted packets to the GPU 250 may be P1, N1, P2, N2, P3, and N3.

Figure 5:
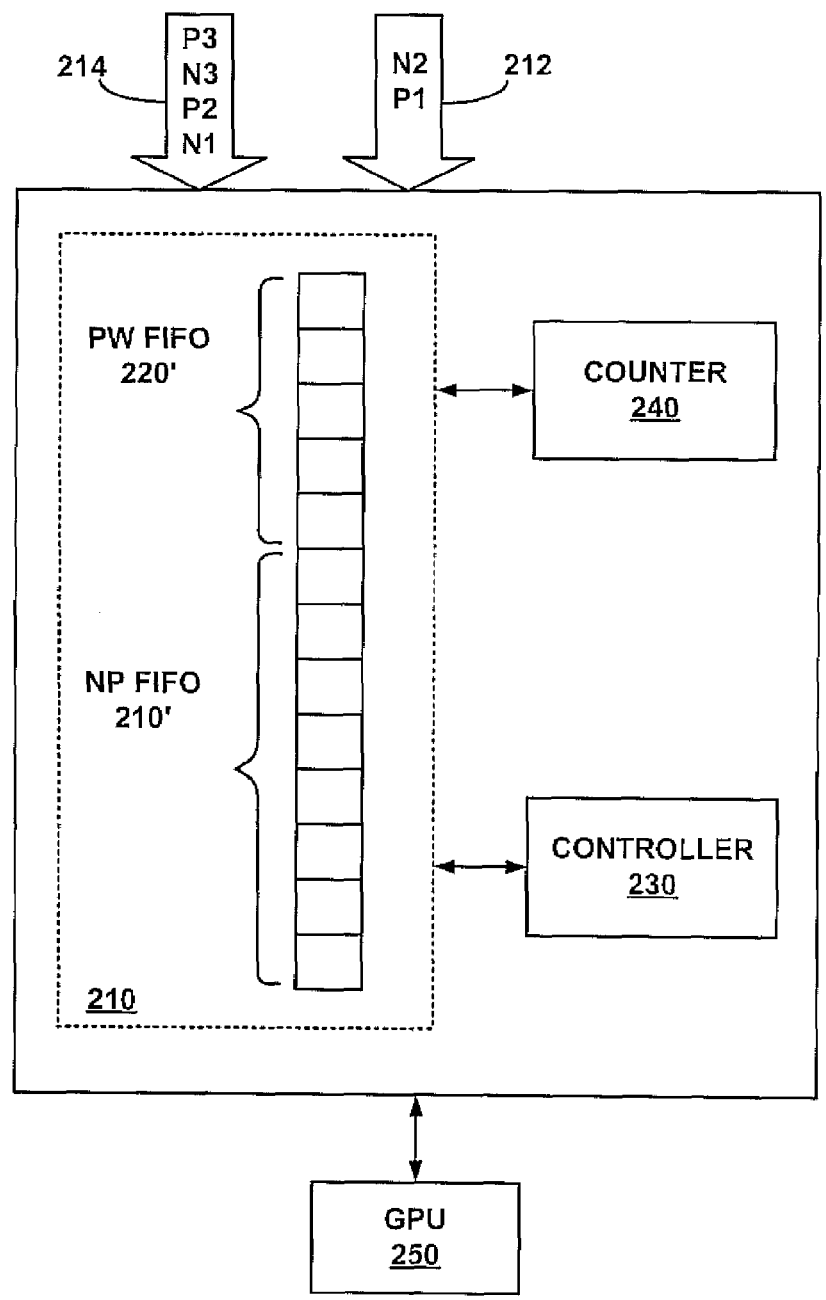
FIG. 5 shows an exemplary system in accordance with one embodiment of the present invention.

Referring now to FIG. 5, an exemplary system 500 in accordance with one embodiment of the present invention is shown. The system 500 operates substantially similar to that of FIGS. 2A-2G, 3A-3G, and 4A-4F. However, system 500 comprises more than one system bus. For example, the system 500 may include the system bus 212 and an additional system bus 214. In this exemplary system, packets P1 and N2 are being received via the system bus 212 and packets N1, P2, N3, and P3 are being received via the system bus 214.

It is appreciated that the system 500 may include one FIFO stack instead of two shown in FIGS. 2A-2G, 3A-3G, and 4A-4F. For example, one FIFO stack 210 may be partitioned into two regions, PW FIFO 220' region and NP FIFO 210' region. The PW FIFO 220' region operates substantially similar to the PW FIFO 220 as described above. The NP FIFO 210' region operates substantially similar to the NP FIFO 210 as described above.

Accordingly, the system in accordance with one embodiment may be extended to multiple buses. Moreover, one memory component may be partitioned into regions instead of using separate FIFO stacks.

Figure 6A:
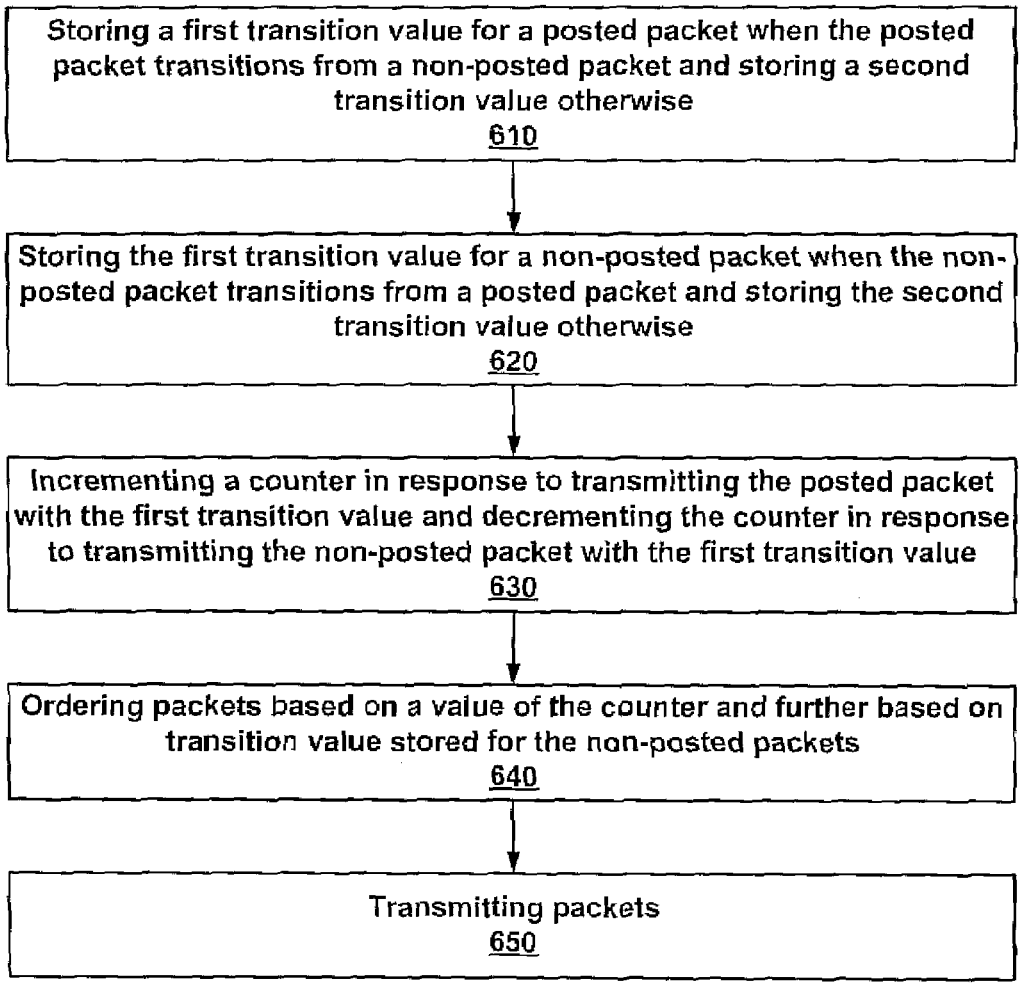

Referring now to FIGS. 6A-6B, an exemplary flow diagram 600A and 600B for loading transitional information and transmitting packets based on the transitional information in accordance with one embodiment of the present invention are shown. At step 610, a first transitional value, e.g., bit value 1, for a posted packet is stored when the posted packet transitions from a non-posted packet. Moreover, at step 610, a second transitional value, e.g., bit value 0, is stored when the posted packet does not transition from a non-posted packet. In one exemplary embodiment, the transitional values are stored in the PW FIFO 220, as presented above.

At step 620, the first transitional value for a non-posted packet is stored when the non-posted packet transitions from a posted packet. Moreover, at step 620, the second transitional value is stored when the non-posted packet does not transition from a posted packet. In one exemplary embodiment, the transitional values are stored in the NP FIFO 210, as presented above.

At step 630, a counter value is incremented in response to transmitting a posted packet with the first transitional value. On the other hand, the counter value is decremented in response to transmitting the non-posted packet with the first transitional value.

At step 640, the packets, e.g., posted and non-posted, are ordered based on the value of the counter and further based on transitional values stored for each of the non-posted packets. At step 650, the packets are transmitted as ordered by the controller 230.

Referring now to FIG. 6B, a method of ordering of packets according to one embodiment is shown. At step 642, a posted packet is transmitted prior to a non-posted packet if a value of the counter is negative and the transitional value of the non-posted packet is 1.

At step 644, a posted packet or a non-posted packet may be when the counter value is non-negative or when the counter value is negative but the transitional value of the non-posted packet is 0. For example, the controller 230 may cause a posted packet or a non-posted packet to be transmitted when the counter 240 is greater than zero.

Similarly, a posted packet or a non-posted packet may be transmitted if a value of the counter is zero and a transitional value associated with a posted packet is the first transition value that indicates a transition. For example, the controller 230 may cause either a non-posted packet or a posted packet to be transmitted to the GPU 250 when the counter 240 value and a transitional value of PW FIFO 220 is one. It is appreciated that a non-posted packet may be transmitted when the PW FIFO 220 is empty.

It is appreciated that the transitional values for posted and non-posted packets may be stored in different partitions within the same memory component. However, it is further appreciated that the transitional values for posted and non-posted packets may be stored in different memory components. According to one embodiment, the transitional value is a one bit value, e.g., 0 or 1.

Accordingly, employing embodiments of the present invention reduce the number of flip-flops because a need to store a tag associated with the address of the last non-posted packet is eliminated. Moreover, multiple buses may be used. Furthermore, transitional information for non-posted packets and posted packets may be stored within the same memory component that is partitioned.

Figure 7:
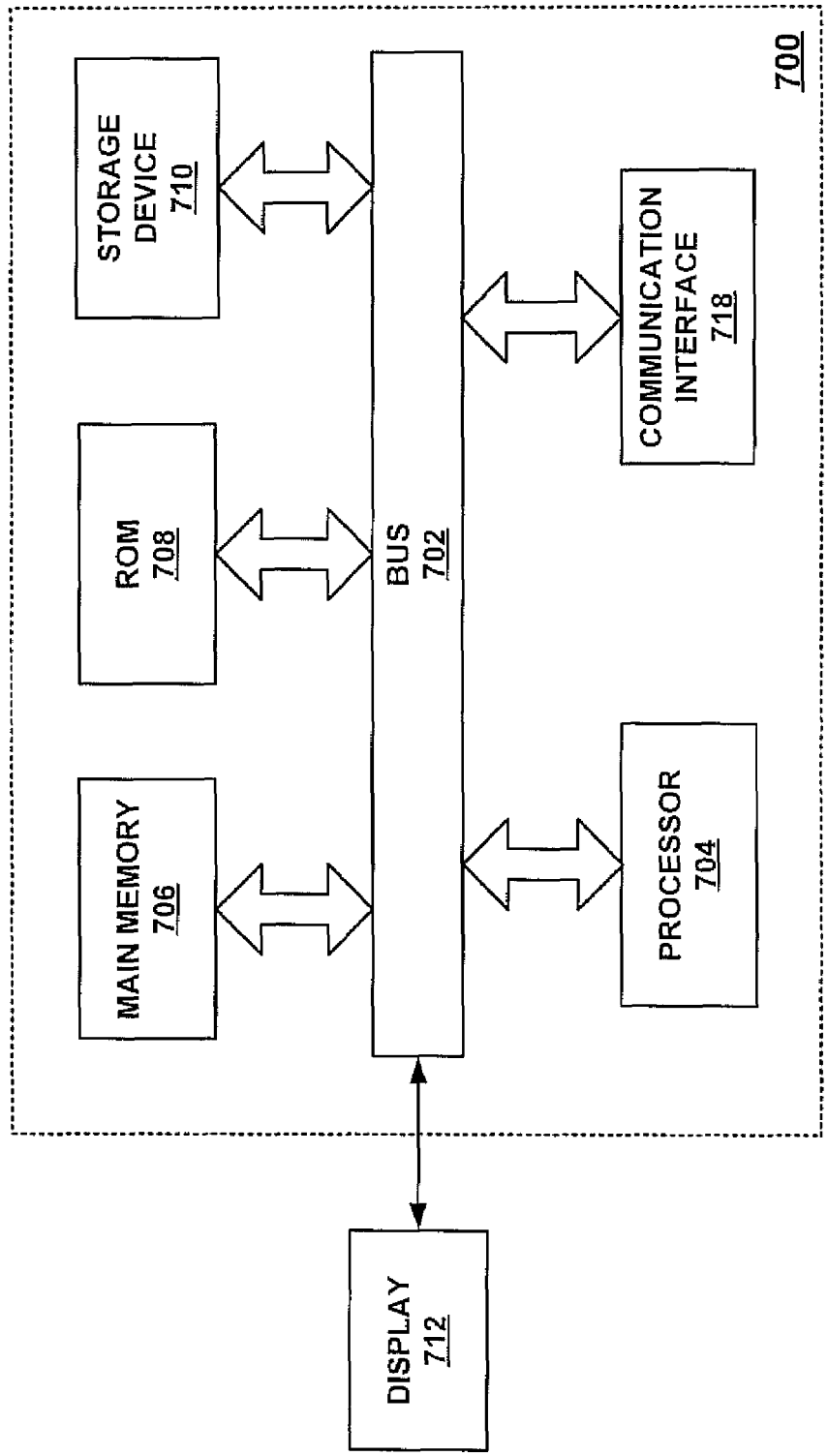
FIG. 7 illustrates a general purpose computer system that may serve as a platform for embodiments of the present invention.

FIG. 7 is a block diagram that illustrates a computer system platform 700 upon which an embodiment of the invention may be implemented. Computer system 700 may implement the process for ordering posted packets and non-posted packets as shown in FIGS. 2A-2G, 3A-3G, 4A-4F, 5 and 6A-6B. The computer system 700 includes a bus 702 or other communication mechanism for communicating information, and a processor 704 coupled with bus 702 for processing information.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A non-volatile storage device 710, such as a magnetic disk or optical disk, is provided and coupled to bus 702 for storing information and instructions and may store the persistent internal queue.

According to one embodiment, the instructions for implementing the virtual device may be stored on any one of the memory components (e.g., RAM, ROM, non-volatile storage device and etc.). Computer system 700 may be coupled via bus 702 to an optional display 712 for displaying information to a computer user.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for ordering packets comprising:
a first memory configured to store a first potion of transition information for a first type packets;
a second memory configured to store a second portion of transition information for a second type packets;
a counter for incrementing in response to detecting a first transition in said first portion of transition information for said first type of packets in said first memory and decrementing in response to detecting a second transition in said second portion of transition information for said second type of packets in said second memory; and
a controller configured to order packets based on a counter value of said counter and further based on said second portion of transition information in said second memory.

2. The system as described in claim 1, wherein said first memory is configured to store a first value when a first type packet is received after a second type packet and is configured to store a second value when said first type of packet is received after said first type of packet.

3. The system as described in claim 2, wherein said counter is incremented by an incremental value in response to detecting said first value.

4. The system as described in claim 1, wherein said second memory is configured to store a first value when a second type of packet is received after a first type of packet and is configured to store a second value when said second type of packet is received after said second type of packet.

5. The system as described in claim 4, wherein said counter is decremented in response to detecting said first value.

6. The system as described in claim 1, wherein said controller is configured to order a first type packet for transmission prior to a second type packet if a value of said counter is negative and said second portion of transition information from said second memory indicates a transition from a first type packet to a second type packet, and wherein said controller is configured to order either a first type packet or a second type packet when said counter is zero.

7. The system as described in claim 1, wherein said first memory and said second memory are within different partitions of a same memory component.

8. The system as described in claim 1, wherein a value stored by said first memory and said second memory is a one bit value.

9. The system as described in claim 1, wherein said first type packets are posted packets and said second type packets are non-posted packets.

10. The system as described in claim 1, wherein said first portion of transition information and said second portion of transition information are stored in different memory components.

11. A method of ordering posted packets and non-posted packets, said method comprising:
    storing a first transition value for a posted packet when said posted packet is received after a non-posted packet and storing a second transition value for said posted packet when said posted packet is received after a previously received posted packet;
    storing said first transition value for a non-posted packet when said non-posted packet is received after a posted packet and storing said second transition value for said non-posted packet when said non-posted packet is received after a previously received non-posted packet;
    incrementing a counter in response to transmitting said posted packet with said first transition value and decrementing said counter in response to transmitting said non-posted packet with said first transition value; and
    ordering packets based on a value of said counter and further based on transition values stored for said non-posted packet.

12. The method as described in claim 11, wherein said ordering comprises:
    ordering said posted packet for transmission prior to said non-posted packet if a value of said counter is negative and a transitional value associated with said non-posted packet is said first transition value that indicates a transition.

13. The method as described in claim 11, wherein said ordering comprises:
    ordering either said posted packet or said non-posted packet if a value of said counter is non-negative or if a value of said counter is negative and a transition value associated with said non-posted packet is said second transition value that indicates no transition.

14. The method as described in claim 11, wherein transition values for said posted and non-posted packets are stored in different partitions of a same memory component.

15. The method as described in claim 11 further comprising:
    subsequent to said ordering, transmitting said posted and non-posted packets.

16. The method as described in claim 11, wherein transition values are one bit values.

17. The method as described in claim 11, wherein transition values for said posted and non-posted packets are stored in different memory components.

18. A non-transitory computer-readable medium storing computer-readable program code which when executed by a computer performs the following:
    storing a first transition value for a posted packet when said posted packet is received after a non-posted packet and storing a second transition value for said posted packet when said posted packet is received after a previously received posted packet;
    storing said first transition value for a non-posted packet when said non-posted packet is received after a posted packet and storing said second transition value for said non-posted packet when said non-posted packet is received after a previously received non-posted packet;
    incrementing a counter in response to transmitting said posted packet with said first transition value and decrementing said counter in response to transmitting said non-posted packet with said first transition value; and
    ordering packets based on a value of said counter and further based on transition values stored for said non-posted packet.

19. The non-transitory computer-readable medium as described in claim 18, wherein said ordering comprises:
    ordering said posted packet for transmission prior to said non-posted packet if a value of said counter is negative and a transitional value associated with said non-posted packet is said first transition value that indicates a transition.

20. The non-transitory computer-readable medium as described in claim 18, wherein said ordering comprises:
    ordering either said posted packet or said non-posted packet if a value of said counter is non-negative or if a value of said counter is negative and a transition value associated with said non-posted packet is said second transition value that indicates no transition.

21. The non-transitory computer-readable medium as described in claim 18, wherein transition values for said posted and non-posted packets are stored in different partitions of a same memory component.

* * * * *